United States Patent
Ueyanagi et al.

[11] Patent Number: 6,154,326
[45] Date of Patent: Nov. 28, 2000

[54] OPTICAL HEAD, DISK APPARATUS, METHOD FOR MANUFACTURING OPTICAL HEAD, AND OPTICAL ELEMENT

[75] Inventors: Kiichi Ueyanagi; Kazuo Baba, both of Nakai-machi, Japan

[73] Assignee: Fuji Xerox Co., Ltd., Tokyo, Japan

[21] Appl. No.: 09/271,868

[22] Filed: Mar. 18, 1999

[30] Foreign Application Priority Data

Mar. 19, 1998 [JP] Japan .................................. 10-070501
Sep. 22, 1998 [JP] Japan .................................. 10-267656

[51] Int. Cl.$^7$ ............................ G02B 7/02; G11B 21/10; G11B 7/00
[52] U.S. Cl. ............................. 359/819; 369/43; 369/112
[58] Field of Search ................................. 359/819, 823, 359/824; 369/43, 112; 385/124

[56] References Cited

U.S. PATENT DOCUMENTS

| | | | |
|---|---|---|---|
| 5,450,378 | 9/1995 | Hekker | 369/103 |
| 5,481,386 | 1/1996 | Shimano et al. | 369/44.12 |
| 5,497,359 | 3/1996 | Mamin et al. | 369/44.15 |
| 5,615,203 | 3/1997 | Fukakusa | 369/244 |
| 5,726,436 | 3/1998 | Oka et al. | 250/201.5 |
| 5,729,393 | 3/1998 | Lee et al. | 359/819 |
| 5,793,407 | 8/1998 | Park et al. | 347/258 |

FOREIGN PATENT DOCUMENTS

| | | |
|---|---|---|
| 0 281 756 A2 | 9/1988 | European Pat. Off. . |
| 0 727 777 A1 | 8/1996 | European Pat. Off. . |
| 0 814 468 A1 | 12/1997 | European Pat. Off. . |
| 0 919 993 A2 | 6/1999 | European Pat. Off. . |
| 42 44 268 A1 | 7/1994 | Germany . |
| 44 46 325 A1 | 7/1995 | Germany . |
| 4-60931 | 2/1992 | Japan . |
| 5-249307 | 9/1993 | Japan . |
| 7-182688 | 7/1995 | Japan . |
| 8-321070 | 12/1996 | Japan . |
| 11-176007 | 7/1999 | Japan . |
| 2 289 974 | 12/1995 | United Kingdom . |
| WO 97/41556 | 11/1997 | WIPO . |
| WO 98/54707 | 12/1998 | WIPO . |

OTHER PUBLICATIONS

Sumio Hosaka et al., "Nanometer–Sized Phase–Change Recording Using a Scanning Near–Field Optical Microscope with a Laser Diode," *Jpn. J. Appl. Phys.*vol. 35 (1996) pp. 443–447.

Takao Suzuki et al., "Solid Immersion Lens Nea Field Optical Approach for High Density Optical Recording," *Manuscript for Asia–Pacific Data Storage Conference*, (APDSC '97, Taiwan, Jul., 1997) #OC–1.

B. D. Terris et al., "Near–field optical data storage," *Appl. Phys. Lett.*, vol. 68 (2), Jan. 8, 1996, pp. 141–143.

*Nikkei Electronics*, Jun. 15, 1998, No. 718, pp. 45–40.

Chul Woo Lee et al., "Feasibility Study on Near field Optical Memory Using A Catadioptric Optical System," *Optical Data Storage Topical Meeting*, May 11–13, 1998.

G. Ohtsu Electronics, May 1996, pp. 92–95.

Terris et al., "Near–Field Optical Data Storage Using a Solid Immersion Lens," *Appl. Phys. Lett.*65(4), pp. 388–390, Jul. 25, 1994.

Patent Abstracts of Japan, publication No. 57200001, Dec. 8, 1982.

Patent Abstracts of Japan, publication No. 58177535, Oct. 18, 1983.

*Primary Examiner*—Ricky Mack
*Attorney, Agent, or Firm*—Oliff & Berridge, PLC

[57] ABSTRACT

An optical head which implements high recording density of a recording medium and which is miniaturized in size and improved in data transfer rate, a disk apparatus, and a method for manufacturing the optical head are provided. A laser beam is emitted from a semiconductor laser, the laser beam is collimated by the collimator lens to a collimated beam and reflected by a mirror, condensed by an condense lens, and incident to an incident surface of a transparent condensing medium. The condensed beam which was incident to the incident surface is refracted by the incident surface, the refracted beam is condensed on a condense surface, a beam spot is formed on the condense surface, and a near field wave leaks from a small aperture. The near field wave leaked from the small aperture propagates in a recording layer of a recording. The beam is served for recording/reproduction on the recording layer.

66 Claims, 20 Drawing Sheets

OPTICAL HEAD, DISK APPARATUS, METHOD FOR MANUFACTURING OPTICAL HEAD, AND OPTICAL ELEMENT

BACKGROUND OF THE INVENTION

1. Field of the Invention

This invention relates to an optical head and disk apparatus which use near field wave, and a method for manufacturing optical heads, and more particularly, relates to an optical head which implements high density recording on a recording medium and a small-sized optical head of improved data transfer rate, a disk apparatus, a method for manufacturing optical heads, and an optical element for an optical head.

2. Description of Related Art

In the field of optical disk apparatus, the optical disk has changed historically from the compact disk (CD) to the digital video disk (DVD), which has a large recording capacity and is capable of high density recording. The recent development of high performance computers and high resolution displays has resulted in increasing demand for large capacity recording.

The recording density of an optical disk depends basically on the diameter of an optical spot formed on a recording medium. Recently, the near field wave technology in the field of the microscope has been applied to the optical recording technology as a technology for miniaturizing the beam spot diameter. As the conventional optical disk apparatus which uses the near field wave, for example, the optical disk described in the literature (Jpn. J. Appl. Phys., Vol. 35 (1996) P. 443) and U.S. Pat. No. 5,497,359 has been known.

FIG. 21(a) and FIG. 21(b) show an optical disk apparatus described in the literature (Jpn. J. Appl. Phys., Vol. 35 (1996) P. 443). As shown in FIG. 21(a), the optical disk apparatus 190 is provided with a semiconductor laser 191 that emits a laser beam 191a, a coupling lens 192 that changes the laser beam 191a emitted from the semiconductor laser 191 to a collimated beam 191b, and an optical fiber 193 which is polished in a taper shape having a larger diameter at the incident end 193a and a smaller diameter at the emission end 193b, and provided with a probe 194 that introduces the collimated beam 191b which comes from the coupling lens 192 from the incident end 193a, and a recording medium 195 on which the information is recorded by means of the near field wave 191c that leaks from the emission end 193b of the optical fiber 193.

The recording medium 195 has a recording layer 195a consisting of GeSbTe, which is a phase change recording medium, which recording medium is heated by incident near field wave 191c, and then the heating causes phase change between crystal/amorphous, and difference in reflectance between both phases is utilized for recording.

The optical fiber 193 has the Incident end 193a having a diameter of 10 μm and the emission end 193b having a diameter of 50 nm, and is coated with a metal film 194b consisting of a metal such as aluminum with interposition of a clad 194a to prevent the beam from leaking to somewhere other than the emission end 193b. The diameter of the near field wave 191c has the approximately same diameter as the diameter of the emission end 193b, therefore the high density recording of several 10 Gbits/inch$^2$ is possible.

For reproduction, as shown in FIG. 21(b), a near field wave 191c having such a low power as it does not cause phase change is irradiated onto the recording layer 195a by use of the same optical head as used for recording, the reflected beam 191d from the recording layer 195a is condensed on a photomultiplier 197 by means of a condenser lens.

FIG. 22 shows an optical head of an optical disk apparatus disclosed in U.S. Pat. No. 5,497,359. The optical head 50 is provided with an condense lens 52 that condenses a collimated beam 51 and an Super SIL (Super Solid Immersion Lens) 54 having the form of bottom-cut sphere placed with the bottom plane 54a perpendicular to the condensed beam 53 from the condense lens 52. The collimated beam 51 is condensed by the condense lens 52 and the condensed beam 53 is incident onto the spherical incident surface 54b, the condensed beam 53 is refracted at the incident surface 54b and condensed on the bottom surface 54a to form a beam spot 55 on the bottom surface 54a. Because the wavelength of the beam becomes short in inversely proportional to the refractive index in the internal of the super SIL 54, the diameter of the beam spot becomes small in proportion to it. A part of the beam condensed on the beam spot 55 is totally reflected toward the incident surface 54b, but the beam leaks partially from the beam spot 55 to the outside of the super SIL 54 as a near field wave 57. A recording medium having the approximately same refractive index as that of the super SIL 54 is located at the close distance from the bottom surface 54a so that the distance is sufficiently smaller than a wavelength of the wave, then the near field wave 57 is coupled with the recording medium 56 and propagates in the recording medium 56. The information is recorded on the recording medium 56 by the propagation beam.

By structuring the Super SIL 54 so that the collimated beam 51 is condensed at the position r/n (r denotes the radius of the Super SIL) distant from the center 54c of the semispherical surface 54b, the spherical aberration due to the Super SIL 54 is reduced and the numerical aperture in the Super SIL 54 is increased, and further the diameter of the beam spot 55 is minimized. In detail, the beam spot 55 is minimized according to the equation 1.

$$D_{1/2}=k\lambda/(n \cdot NAi)=k\lambda/(n^2 \cdot NAo) \qquad (1)$$

where, $D_{1/2}$: beam spot diameter where the intensity becomes a half of the maximum intensity.

k: proportional constant (normally around 0.5) which depends on the intensity distribution of an optical beam λ: wavelength of an optical beam n: refractive index of an Super SIL 54

NAi: numerical aperture in an Super SIL 54

NAo: numerical aperture of an incident beam to an Super SIL 54

The collimated beam 51 is condensed as the beam spot 55 without absorption on the optical path and high optical utilization factor is obtained. As the result, a beam source having a relatively low output is sufficient for use and the reflected beam is detected without a photomultiplier.

PROBLEM OF THE RELATED ART

However, according to the conventional optical disk apparatus 190, though a beam spot having a size of several ten nm is formed on a recording medium, a laser beam which enters an optical fiber 193 is partially absorbed in its inside due to the taper shape of the optical fiber 193, and the optical utilization factor is as low as 1/1000 or lower disadvantageously. Because of the low optical utilization factor, a photomultiplier 197 is undesirably required to detect the reflected beam 191d and the photomultiplier leads to a large sized as well as expensive optical head. Further, slow response speed of the photomultiplier 197 and heavy weight optical head result in the slowed-down tracking speed. Due to many problems such as a low transfer rate due to slow rotation of an optical disk, much improvement is required for practical use.

FIG. 23 is a graph for describing the problem of the conventional optical head 50 shown in FIG. 22, which was presented by T. Suzuki in #OC-1 in Asia-Pacific Data Storage Conference (Taiwan, 1997. 7), the relation between the refractive index n of a SIL 54 and NAo is shown. There is a reversal relation between NA of incident beam to the SIL 54, namely the maximum value θmax of the incident angle θ, and the refractive index n of the SIL 54, and the two values cannot be increased independently. It is understandable as shown in the graph that the possible maximum value NAomax of NAo of the incident beam becomes gradually smaller with increasing of the refractive index of the SIL 54, because the beam having a large incident angle which is caused from increased NAo larger than the maximum NAomax enters directly into the recording medium 56 without passing through the SIL 54 and the size of the beam spot 55 positioned at the recording medium 56 becomes larger instead. For example, if n=2, then NAomax is 0.44, the product n·NAomax does not exceeds the value of 0.8 to 0.9 for any combination of n and NAomax. This value is the theoretical limit and the actual value is smaller (0.7 to 0.8) than the theoretical value.

B. D. Terris et al. presented their test result on the Super SIL in Appl. Phys. Lett., Vol. 68, (1996), P. 141. According to the test report, a laser beam having a wavelength of 0.83 μm was condensed to form a beam spot having a diameter of 0.317 μm by use of a Super SIL having a refractive index n=1.83 placed between an condense lens and a recording medium, that is, $D_{1/2}=\lambda/2.3$ was obtained. In this case, NA is 0.4, n·NAmax is about 0.73. The experimental result with use of this system suggests the possibility of high recording density as high as 0.38 Gbits/cm$^2$, which is several times that of the conventional system.

In detail, the conventional optical head 50 with a laser beam having a wavelength of 400 nm gives a beam spot having a diameter of 0.2 μm at the best because there is a reversal relation between the refractive index of the SIL and the maximum Naomax, and the theoretical limit of the product n·NAomax is 0.8 to 0.9, and the actual limit is 0.7 to 0.8 though the optical utilization factor is high. The diameter of the beam spot is several times larger than that of conventional example in which a probe 194 is used for condensing, and thus the conventional optical head 50 is disadvantageous in that the recording density cannot be enhanced.

FIG. 24 shows a conventional optical head described in the literature "NIKKEI ELECTRONICS (Jul. 15, 1998) (No. 718)". The optical head is, called as SIM (Solid Immersion Mirror) type, provided with a transparent condensing medium 101 having a concave incident surface 101*a* on which a collimated laser beam 2*b* is incident, a condense plane 101*b* provided on the position facing to the incident surface 101*a*, a planer reflecting surface 101*c* provided on the periphery of the condense plane 101*b*, and a non-spherical reflecting surface 101*d* formed on the periphery of the incident surface 101*a*, a planer reflecting film 102 formed on the surface of a planer reflecting surface 101*c*, and a non-spherical reflecting film 103 formed on the surface of the non-spherical reflecting surface 101*d*. A collimated laser beam 2*b* comes to the incident surface 101*a* of the transparent condensing medium 101 of the optical head having the structure as described herein above, the incident collimated laser beam 2*b* which comes to the incident surface 101*a* is diffused on the incident surface 101*a*, the diffused beam 2*d* is reflected on the planer reflecting film 102, the reflected beam 2*e* is reflected on the non-spherical reflecting film 103, the reflected beam is condensed on the condense plane 101*b*, and a beam spot 9 is formed on the condense plane 101*b*. The near field wave 10 which leaks from the condense plane 101*b* is served for recording and reading on the recording layer 8*a* of a recording medium 8. The numeral aperture NA of the planer reflecting surface 101*c* of the transparent condensing medium 101 is around 0.8, and the refractive index of the transparent condensing medium 101 is 1.83, and NA in the transparent condensing medium 101 is approximately 1.5.

The conventional optical head shown in FIG. 24 gives a beam spot having a diameter of as large as 0.35 to 0.39 μm and is disadvantageous in that the recording density cannot be enhanced because of the minimizing limit of the spot diameter formed on a condense plane of the transparent condensing medium.

Accordingly, it is the object of the present invention to provide an optical head and optical disk apparatus which are capable of high density recording on a recording medium and enhancing the size minimization and data transfer rate, and a method for manufacturing the optical head.

To achieve the above-mentioned object, the present invention provides an optical head, comprising: a laser emitting a laser beam; an optical system including a transparent condensing medium which has a condense surface and condensing the laser beam to form a beam spot on the condense surface; and a shade provided on the transparent condensing medium and having an aperture, wherein the aperture is positioned at which the beam spot is formed and a size of the aperture is smaller than a size of the beam spot.

SUMMARY OF THE INVENTION

To achieve the above-mentioned object, the present invention provides An optical head, comprising: a laser emitting a laser beam; an optical system including a transparent condensing medium which has a condense surface and condensing the laser beam to form a beam spot on the condense surface; and a shade provided on the transparent condensing medium and having an aperture, wherein the aperture is positioned at which the beam spot is formed and an area of the aperture is smaller than a size of the beam spot.

To achieve the above-mentioned object, the present invention provides a disk apparatus, comprising: a rotator which rotates a disk which holds an information, an optical head recited above; and an optical head actuator coupled with the optical head.

To achieve the above-mentioned object, the present invention provides a method for manufacturing an optical head comprising: a step in which a transparent condensing medium having a condense plane on which an incident laser beam forms a beam spot is prepared; a step in which a photo-resist having a outside diameter smaller than that of the beam spot is formed on the transparent condensing medium; a step in which a concave is formed by removing the area where the photo-resist does not cover on the transparent condensing medium by etching to the predetermined depth smaller than the wavelength of the laser beam, and a step in which a shade film having an aperture with a smaller area than the size of the beam spot is formed by depositing a shading material on the concave.

To achieve the above-mentioned object, the present invention provides a method for manufacturing an optical head recited above, comprising a step for forming the shade with the aperture on the transparent condensing medium, wherein the shade forming step includes a etching process performed from the condense surface side of the transparent condensing medium.

DETAILED DESCRIPTION OF THE PREFERRED EMBODIMENTS

Figure 1:
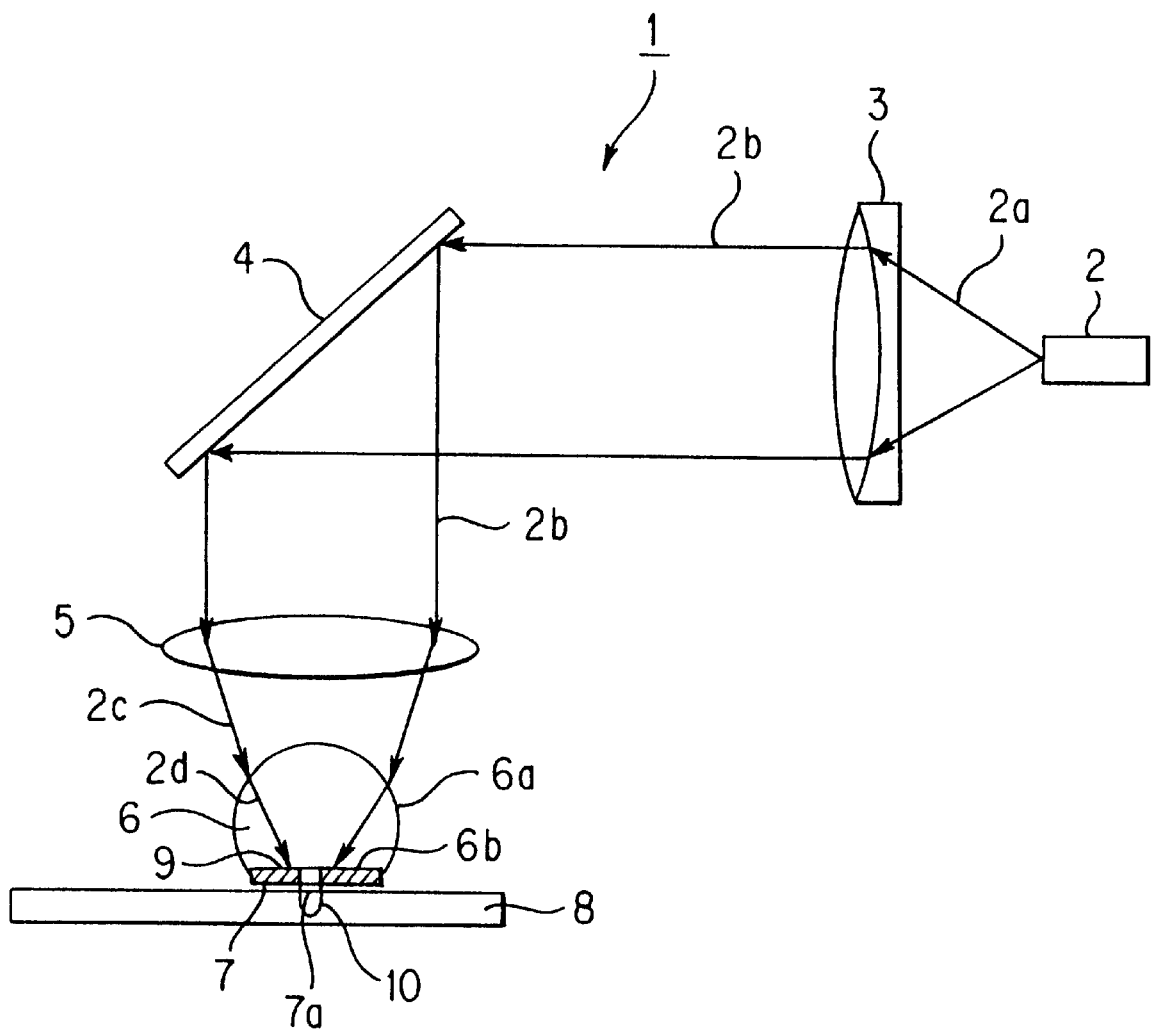
FIG. 1 is a diagram for illustrating the main part of an optical head in accordance with the first embodiment of the present invention.

FIG. 1 shows a main part of an optical head 1 in accordance with the first embodiment of the present invention. The optical head 1 is provided with a semiconductor laser 2 for emitting a laser beam 2a, a collimator lens 3 for converting the laser beam 2a from the semiconductor 2 to a collimated beam 2b, a mirror 4 for reflecting the collimated beam 2b from the collimator lens 3 to the vertical direction, an condense lens 5 for condensing the collimated beam 2b reflected on the mirror 4, a transparent condensing medium 6 on which a beam spot 9 on a condense surface 6b from the incident beam 2c condensed by the condense lens 5 is incident, and a shading film 7 having a small aperture a formed by deposition on the surface of the condense surface 6b of the transparent condensing medium 6.

A red laser (630 nm), which is the shortest commercially available wavelength, or an AlGaInN-based blue laser, which starts to be supplied, may be used as the semiconductor laser 2. By use of a blue laser (400 nm or 410 nm), the beam spot diameter can be minimized to 0.15 μm or smaller.

Figure 2A:
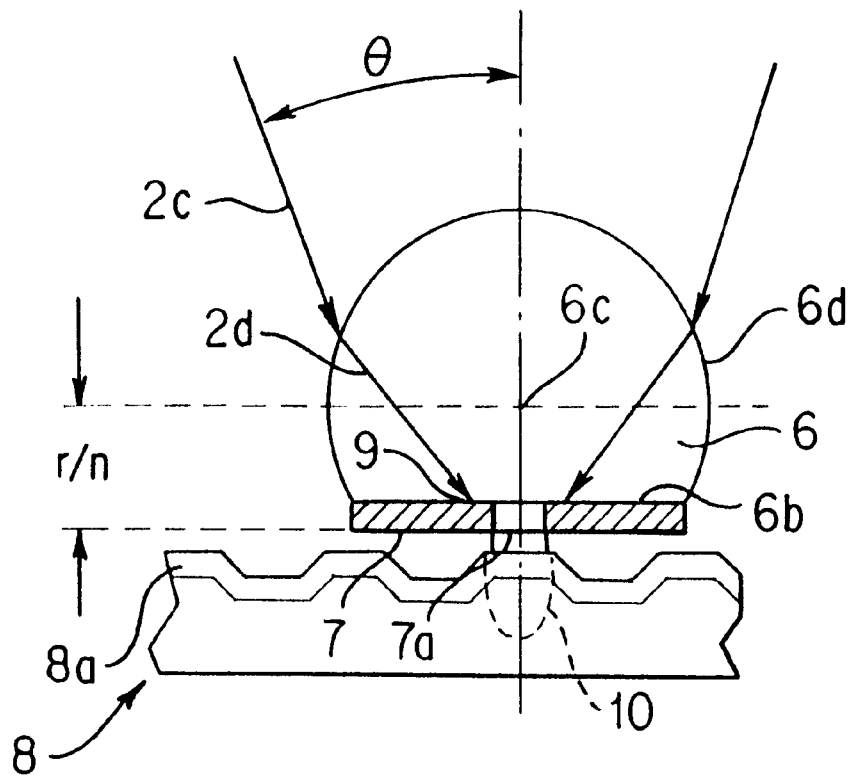
FIG. 2(a) is a diagram for illustrating a transparent condensing medium and a shading film in accordance with the first embodiment.
Figure 2B:
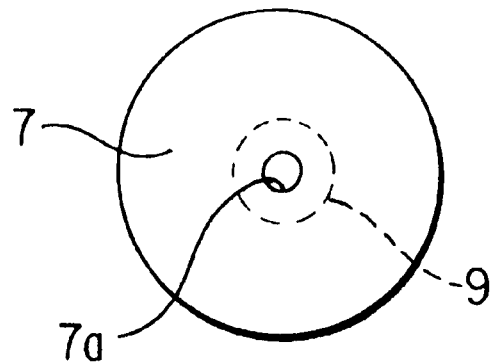
FIG. 2(b) is a bottom view of the diagram shown in FIG. 2(a).
Figure 3A:
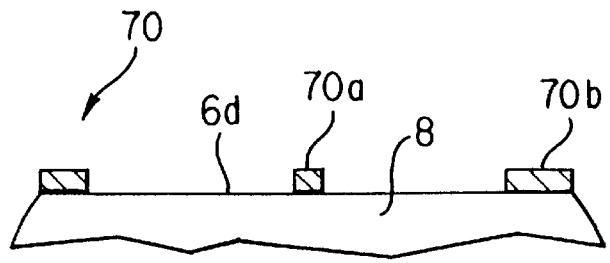
FIG. 3(a) to FIG. 3(d) are diagrams for describing a method for forming the shading film in accordance with the first embodiment.
Figure 3B:
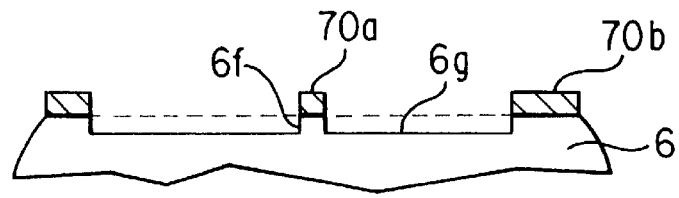
Figure 3C:
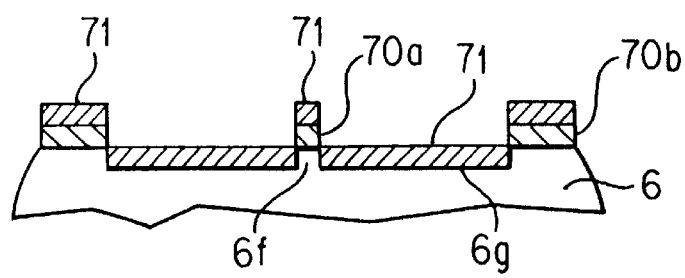
Figure 3D:
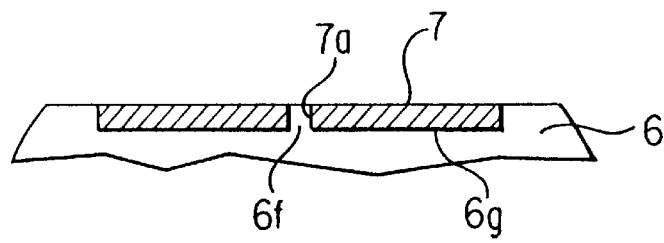

FIG. 2(a) shows the transparent condensing medium 6 and the shading film 7, and FIG. 2(b) is the bottom view thereof.

The transparent condensing medium 6 can be formed from dense flint glass (refractive index=1.91), or crystalline material such as cadmium sulfide CdS (refractive index= 2.5), or zincblende ZnS (refractive index=2.37), and the refractive index of the material has no limitation as long as a material has a refractive index of 1 or higher, a material having a further higher refractive index may be used. Dense flint glass having a refractive index of 1.91 is used in the embodiment of the present invention. The use of crystalline material leads to the minimization of a beam spot diameter by 20% in comparison with dense flint glass. As shown in FIG. 2(a), the transparent condensing medium 6 has a cut-bottom spherical shape (Super SIL structure) so that the condensed beam 2c, which is incident on the spherical incident surface 6a, from the condense lens 5 is refracted on the incident surface 6a and the refracted beam 2d is condensed on the condense surface 6b on the bottom to form a beam spot 9. Here, to form a beam spot 9 on the condense surface 6b means the condense surface 6b is positioned within the depth of focus of the beam spot 9.

The shading film 7 having a thickness smaller than a laser wavelength (for example 10 nm) consists of titanium (Ti), which is a shading material, on which a small aperture 7a having a diameter (for example, 50 nm) smaller than the diameter of a beam spot 9 and smaller than the wavelength of a laser beam at the position corresponding to the beam spot 9, and which prevents the beam from directly emission of the beam spot 9 to the outside and forms a near field wave 10 having the approximately same diameter as that of the small aperture 7a. The small aperture 7a is circular in the present embodiment but may be other shape such as rectangle. The use of a rectangular aperture leads to the smaller track pitch and the higher recording density in comparison with the circular aperture. The diameter of the small aperture 7a will be smaller than 50 nm in the future with further development in high recording density technology and small aperture forming technology in the optical disk technology field.

To condense the beam to the position r/n (r and n are radius and refractive index of the transparent condensing medium 6 respectively) distant from the center 6c of the sphere, the spot diameter of a beam spot 9 is represented by the following equation (1) as described in the description of the conventional example.

$$D_{1/2} = k\lambda/n \cdot NAi = k\lambda/n^2 \cdot NAo) \tag{1}$$

wherein

NAi denotes the numerical aperture in the transparent condensing medium 6 and,

NAo denotes the numerical aperture of an incident beam to the transparent condensing medium 6.

As shown in the equation (1), the diameter of a beam spot 9 is minimized in inverse proportion to the refractive index n of the transparent condensing medium 6, and the minimized diameter minimizes the spherical aberration in condensing. However, because the possible incident angle θ of the condensed beam 2c, namely the numerical aperture NAo and the refractive index n are associated each other in the reversal relationship, the two cannot be large independently. The product of the refractive index n and the maximum NA value is about 0.88, but actually the product is about 0.8 due to the eclipse of a beam. Accordingly, the minimum beam spot diameter $D_{1/2}$ min is represented by the following equation (2).

$$D_{1/2} \text{ min} = k\lambda/(0.8n) = 0.6\lambda/n \text{ (when } k=0.5) \tag{2}$$

The use of dense flint glass (refractive index=1.91), which has the largest refractive index among amorphous materials, for the transparent condensing medium 6 and the use of a red laser (wavelength of 630 nm) as the semiconductor laser 2 gives the minimum beam spot diameter $D_{1/2}$ min of 0.20 μm. The use of a blue laser (400 nm) gives the minimum beam spot diameter $D_{1/2}$ min of about 0.13 μm. These beam spots 9 have the approximately Gaussian intensity distribution.

The small aperture 7a prevents the propagation beam from emission from the small aperture 7a because the diameter of the small aperture 7a is, for example, as small as 1/10 of the laser wavelength, and a near field wave 10 leaks across the same distance as the diameter of the small aperture 7a. When a dielectric material, such as a recording medium 8, is placed near the recording medium 8 to expose it to the near field wave 10, the near field wave 10 enters and propagates into the recording layer 8a of the recording medium 8, and the wave functions for recording/reading on the recording layer 8a. The light intensity of the propagation beam is approximated by the following equation (3).

[Expression 1]

$$I = I_0 \times \int^a \int^a e^{-(x^2+y^2)/\omega^2} dx \cdot dy \tag{3}$$

$$= I_0 \times \frac{\pi}{2} \times \int^a re^{(-r^2/\omega^2)} dr$$

wherein Io: full power of a laser

ω: radius of a beam spot 9 at the condense surface 6b a: radius of the small aperture 7a In detail, in the case of a red laser, the beam intensity of a laser beam which passes through the small aperture 7a is about 15% of the full power of the beam spot 9, and in the case of blue laser, the beam intensity is more than 20%, thus the condensing efficiency is improved by 100 times that of the case in which a conventional optical fiber is used.

FIG. 3(a) to FIG. 3(d) show an embodiment related to a method of this invention for deposit-forming of the shading film 7 and forming of the small aperture 7a. First, a photoresist film 70 for electron beam exposure is coated on the bottom surface 6d of the bottom-cut shaped transparent condensing medium 6, and exposed (FIG. 3(a)) to an electron beam so that a portion 70a which corresponds to the small aperture 7a and a protective portion 70b which corresponds to the periphery of the shading film 7 remain, and after development, the bottom surface 6d is etched about 100 A anisotropically by means of dry etching to form the projection 6f and the bottom surface 6g (FIG. 3(b)). CF$_4$-base gas is used as the etching gas. Next, the Ti film 71 having a thickness of about 100 A for shading is deposited on the entire surface by means of spattering (FIG. 3(c)), the photoresist film 70 (70a and 70b) is dissolved to lift off the Ti film 71 on the portion 70a for the small aperture 7a and the protective portion 70b for the shading film 7 (FIG. 3(d)). The shading film 7 having the small aperture 7a is formed as described hereinabove. Other films which has the light shading property and the adhesiveness to a glass can be used for the shading film 7 besides Ti film.

When the projection 6f of the transparent condensing medium 6 fills inside the small aperture 7a, as shown in this embodiment, comparing to the embodiment that the projection 6f is not formed and the small aperture 7a is filled with air, the air gap between the top of the projection 6f and the surface of the optical disk decreases and then the propagation efficiency of the near field wave is improved. Here, the top of the projection 6f may project or caved from the surface of the shading film 7. Further, as shown in FIG. 3, the top of the projection 6f positioned inside the aperture 7 and the surface of the shading film 7 can be flat viewing from the near field wave emission side of the transparent condensing medium 6, then the divergence of the near field wave can be reduced and the higher recording density can be attained.

In case that the projection 6f is formed to the transparent condensing medium 6, like this embodiment, the top surface of the projection is corresponded to the condense surface 6b. Therefore to form a beam spot on a condense surface 6b means the top surface of the projection is positioned within the depth of focus of the beam spot. However if the thickness of the shading film 7 is as thin as the height of the projection 6f, like this embodiment, the top surface of the projection 6f and the bottom surface 6g where the shading film is formed are both positioned with in the depth of the focus of the beam spot mostly, the adjustment of the beam spot forming position is not much affected by the formation of the projection 6f.

Further more, during the formation process of the small aperture 7 with the well-known etching process, when the etching process is applied from the condense surface 6b of the transparent condensing medium 6, the side wall of etched portion, such as the projection 6f, is exposed to the etching gas and etched gradually, then the portion is properly formed incline. When the shading film is formed around the etched portion, the small aperture 7a of the shading film 7 is tapered along the optical path of the near field wave, which is effective to improve the condensing efficiency.

Next, the operation of the optical head 1 in accordance with the above-mentioned first embodiment is described. A laser beam 2a emitted from the semiconductor laser 2 is converted to a collimated beam 2b by the collimator lens 3 and reflected by the mirror 4, and then condensed by the condense lens 5 and comes onto the incident surface 6a of the transparent condensing medium 6. The condensed beam 2c which has entered through the incident surface 6a is refracted on the incident surface 6a, the refracted beam 2d is condensed on the condense surface 6b to form a beam spot 9 on the condense surface 6b, and the near field wave 10 leaks from the small aperture 7a. The near field wave 10 which has leaked from the small aperture 7a enters and propagates into the recording layer 8a of the recording medium 8, and the beam functions for recording/reproduction on the recording layer 8a.

According to the optical head 1 in accordance with the above-mentioned first embodiment, the near field wave which has leaked from the beam spot 9 formed on the condense surface 6b is diaphragmed by the small aperture 7a, therefore the near field wave spot formed on the recording medium 8.

The diaphragming of the near field wave by use of the small aperture 7a having a diameter smaller than the wavelength of the laser beam 2a does not much reduce the central optical intensity of the near field wave from the small aperture 7a to bring about high optical efficiency factor. Therefore, a semiconductor laser 2 having a relatively low output such as several mW can be used as a beam source. Because the reflected beam from the recording medium 8 increases in proportion to the propagation beam from the small aperture 7a, an Si photo-detector, which is generally used for optical disk memory, can be used for detection of the reproduction beam without using a photomultiplier, thus the optical head 1 can be lightweight and high speed readable.

Figure 4A:
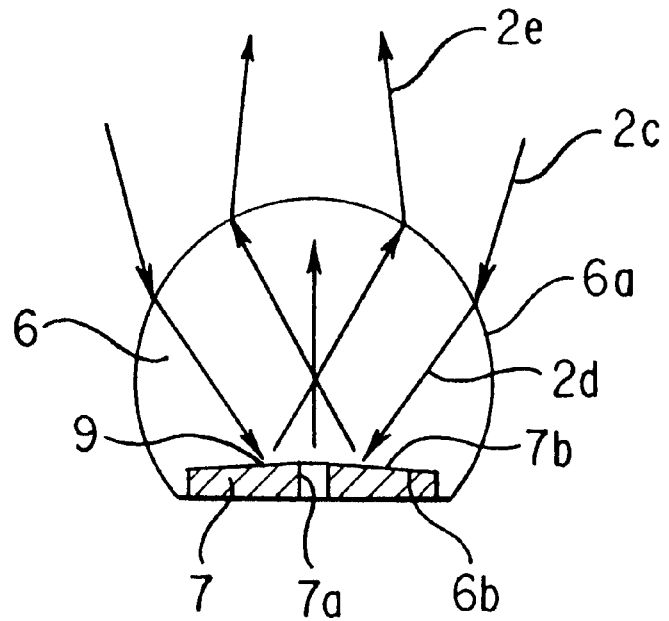
FIG. 4(a) and FIG. 4(b) are diagrams for illustrating modified examples of the shading film in accordance with the first embodiment.
Figure 4B:
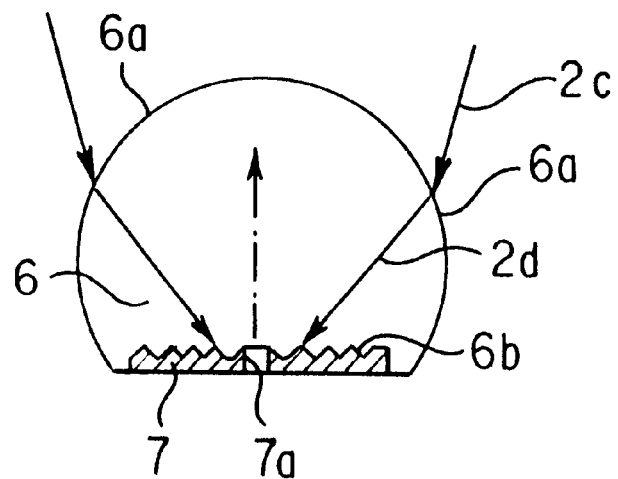

FIG. 4(a) and FIG. 4(b) show modified examples of the shading film 7. The shading film 7 may have the concave or projected conical surface as shown in FIG. 4(a), which is formed by inclining the surface of the bottom plane 6g to incline the surface to be etched with respect to the incident beam during etching process of the bottom plane 6d of the transparent condensing medium 6. Alternatively as shown in FIG. 4(b), the shading film 7 may have a rough surface, which is formed by use of high speed etching technique with supplying a relatively large current during etching of the bottom plane 6d of the transparent condensing medium 6. The high reflectance on the surface 7b of the shading film 7 results in high beam intensity of the beam reflected on the shading film 7 in comparison with a signal beam to be returned from the small aperture 7a and results in the reduced amplification factor of the front end amplification during signal processing to a lower S/N. On the other hand, the high absorptance on the shading film 7 results in the temperature rising of the portion of the shading film 7 where the beam spot 9 is irradiated to adversely influence recording unpreferably. To avoid such problems, the structures as shown in FIG. 4(a) and FIG. 4(b) are used, and in such a structure, the reflected beam 2e does not return to the condense lens 5, and S/N is improved. On the other hand, the reflected beam which passes the small aperture 7a passes through the same path as the incident beams 2c and 2d and enters a beam detector (omitted in the drawing) As described hereinabove, the proportion of the stray beam which enters the beam detector is reduced to result in the increased amplification factor of the DC type preamplifier and improved S/N.

Figure 5:
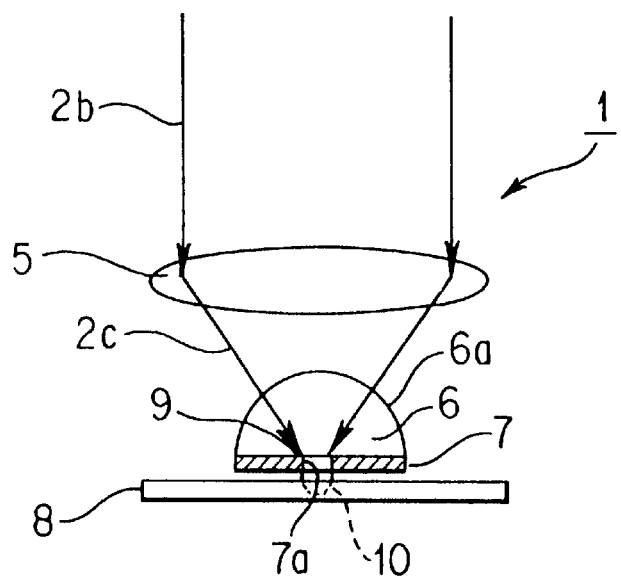
FIG. 5 is a diagram for illustrating the main part of an optical head in accordance with the second embodiment of the present invention.

FIG. 5 shows the main part of the optical head in accordance with the second embodiment of the present invention. The optical head 1 has a semi-spherical transparent condensing medium 6 (SIL type), and other components are same as those shown in the first embodiment. The condensed beam 2c which has come onto the incident surface 6a of the transparent condensing medium 6 is condensed at the center of the sphere. In this case, the condensed beam 2c is not refracted on the incident surface 6a, the numerical aperture NA in the transparent condensing medium 6 is therefore the same as NA at the position where the beam has come out from the condense lens 5, and the increased NA due to refraction cannot be attained. Accordingly, the beam spot is represented by the following equation (4) in this case.

$$D_{1/2}=k\lambda/n\cdot NAo) \qquad (4)$$

wherein NAo represents the numerical aperture of the incident beam to the SIL type transparent condensing medium 6.

According to the optical head 1 in accordance with the above-mentioned second embodiment as similar to the first embodiment, because the diameter of the near field wave 10 is determined by the diameter of the small aperture 7a and does not depend on the diameter of the beam spot 9, and is therefore not so influenced by the aberration and positional, NAo can be about 0.8, which is evaluated as relatively large as 0.8 in comparison with the optical head which uses a conventional SIL, and the condensing equivalent to that brought about by the Super SIL structure described in the first embodiment can be obtained. In detail, a red laser (wavelength of 630 nm) and a blue laser (400 nm) give the minimum beam spot diameters of 0.2 $\mu$m and 0.13 $\mu$m respectively, and the light intensity of the near field wave which leaks from the small aperture 7a, namely the optical utilization efficiency, is same as that obtained in the first embodiment.

Figure 6A:
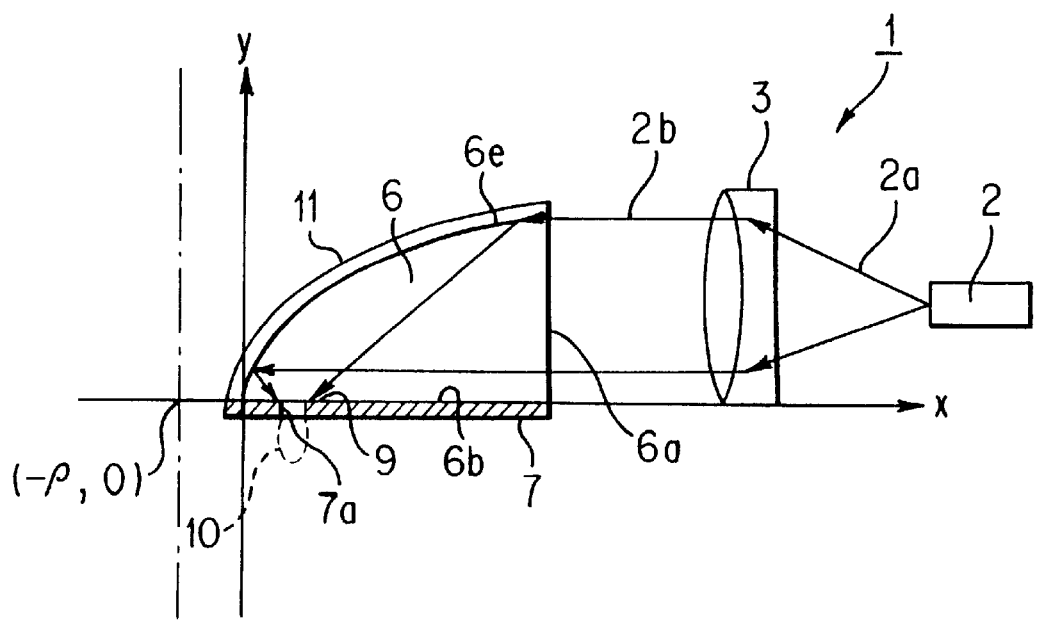
FIG. 6(a) is a diagram for illustrating the main part of an optical head in accordance with the third embodiment of the present invention.
Figure 6B:
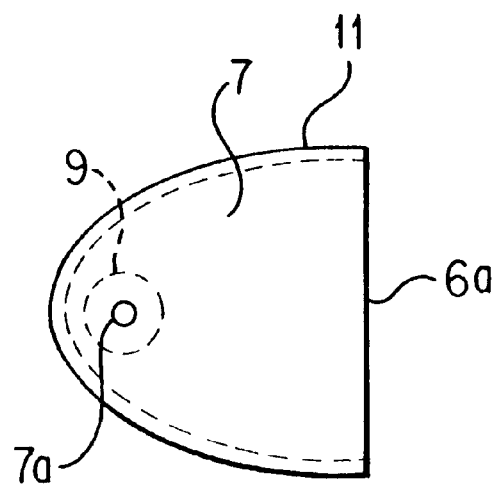
FIG. 6(b) is a bottom view of the diagram shown in FIG. 6(a).

FIG. 6(a) shows the main part of an optical head in accordance with the third embodiment of the present invention, and the FIG. 6(b) shows the bottom view thereof. The optical head 1 is provided with a semiconductor laser 2 for emitting a laser beam 2a, a collimator lens 3 for converting the laser beam 2a from the semiconductor laser 2 to a collimated beam 2b, a transparent condensing medium 6 for condensing the collimated beam 2b from the collimator lens 3 and forming a beam spot 9 on the condense surface 6b, a reflecting film 11 which is deposited and formed on the surface of a reflecting surface 6e of the transparent condensing medium 6, and a shading film 7 having a small aperture 7a which is deposited and formed on the surface of a condense surface 6b of the transparent condensing medium 6.

The transparent condensing medium 6 consists of, for example, dense flint glass (refractive index=1.91), and has an incident surface 6a from which the collimated beam 2b enters, a reflecting surface 6e for reflecting the collimated beam 2b which comes onto the incident surface 6a, and a condense surface 6b on which a beam spot 9 is formed.

The reflecting surface 6e is a part of a paraboloid of revolution. The principal axis of the cross section (6e) of the paraboloid of revolution is assigned to x-axis and the vertical axis is assigned to y-axis, and the focus position is assigned to (p, 0), then the cross section (6e) is represented by the following equation (5).

$$y^2 = 4px \tag{5}$$

The condensing in the internal of the transparent condensing medium 6 with use of the paraboloid of revolution principally brings about non-aberration condensing (Optics, by Hiroshi Kubota, Iwanami Shoten, p. 283), and a beam is condensed on a beam spot 9 by one condense mirror. In this method, no restriction on the refractive index of the transparent condensing medium 6 and the numerical aperture NA of a condensed beam by a reflecting surface 6e is applied, and a high refractive index can give NA value near 1 even though the refractive index is high. Therefore, the beam spot diameter is represented by the following equation (6) in this case.

$$D_{1/2} = \lambda/(n \cdot NAr) \tag{6}$$

wherein NAr denotes the numerical aperture of the reflected beam from the reflecting surface 6e.

Assuming the focus position of the paraboloid of revolution P=0.125 mm and the top end of the paraboloid of revolution (x, y)=(2 mm, 1 mm), then the convergent angle from the top end of 60 degrees or larger is obtained, and gives NA of the reflecting surface 6e of 0.98, this value is 1.6 or more times larger than NA=0.6 in the conventional DVD.

According to the optical head 1 in accordance with the above-mentioned third embodiment, though NAr is normally limited to about 0.9 with design margin actually for a red laser (wavelength of 630 nm) and blue laser (400 nm), the beam spot diameter can be minimized to 0.19 μm and 0.12 μm for a red laser (wavelength of 630 nm) and blue laser (400 nm) respectively, the beam quantity of a near field wave 10 which leaks from the small aperture 7a, namely the optical utilization factor, can be increased by about 20% in comparison with the first embodiment.

No chromatic aberration occurs because of reflection type condensing.

The focus position deviation due to temperature change is reduced because the optical system of the present embodiment is a so-called infinite system, in which the laser beam 2b between the collimator lens 3 and the incident surface 6a of the transparent condensing medium 6 is collimated.

Figure 7:
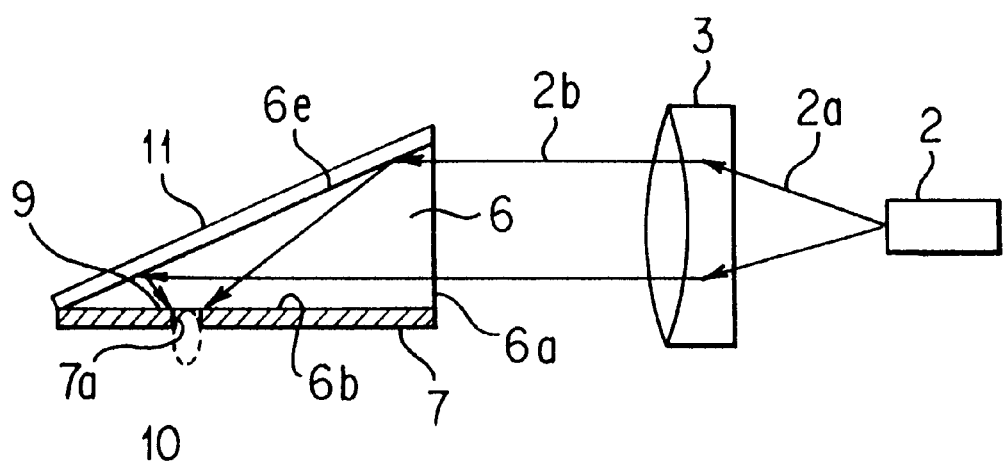
FIG. 7 is a diagram for illustrating the main part of an optical head in accordance with the fourth embodiment of the present invention.

FIG. 7 shows the main part of an optical head in accordance with the fourth embodiment of the present invention. The optical head 1 is provided with a transparent condensing medium 6 having a planer reflecting surface 6e and a reflecting hologram which is served as a reflecting film 11 on the surface of the reflecting surface 6e, and other components are same as those used in the third embodiment. The reflecting hologram may be a binary hologram or a volume hologram consisting of organic photosensitive material. A reflecting film comprising a highly reflecting metal layer consisting of a metal such as aluminum may be provided on the outside of the hologram. The planer shape of the reflecting surface 6e of the transparent condensing medium 6 helps improve the productivity in comparison with the third embodiment.

Figure 8A:
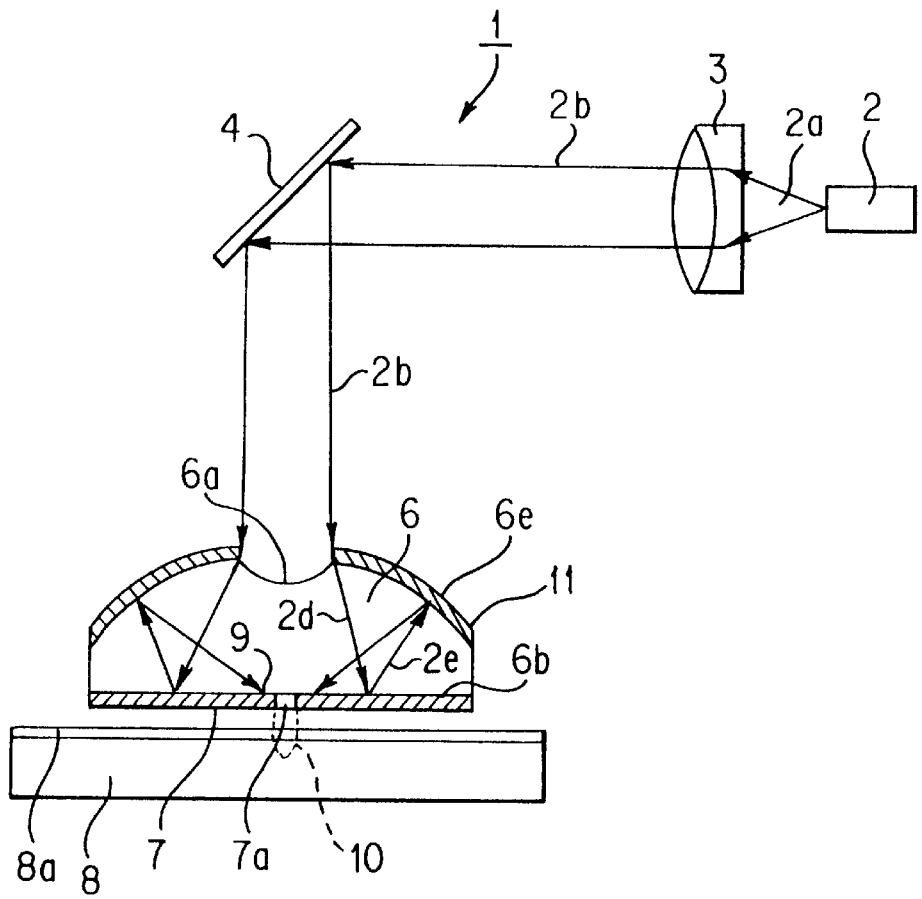
FIG. 8(a) is a diagram for illustrating the main part of an optical head in accordance with the fifth embodiment of the present invention.
Figure 8B:
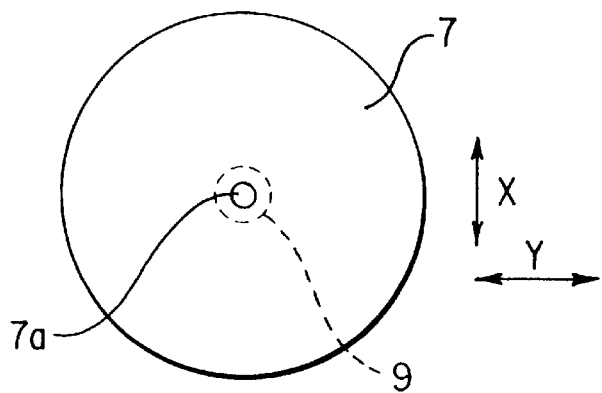
FIG. 8(b) is a diagram for illustrating a shading film of the optical head shown in FIG. 8(a).

FIG. 8(a) and FIG. 8(b) show the main part of an optical head in accordance with the fifth embodiment of the present invention. As shown in FIG. 8(a), an optical head 1 uses a transparent condensing medium 6 of SIM (Solid Immersion Mirror) type, and provided with a semiconductor laser 2 for emitting a laser beam 2a, a collimator lens 3 for converting the laser beam 2a from the semiconductor laser 2 to a collimated beam 2b, a mirror 4 for reflecting the collimated beam 2b from the collimator lens 3 in the vertical direction, an incident surface 6a with a form of concave on which the collimated beam 2b enters from the mirror 4, a condense surface 6b disposed at the position facing the incident surface 6e, a reflecting film 11 deposited and formed on the reflecting surface 6e of the transparent condensing medium 6, and a shading film 7 having a small aperture 7a deposited and formed on the condense surface 6b of the transparent condensing medium 6. The small aperture 7a is formed at the position corresponding to a beam spot 9 as shown in FIG. 8(b) in the same manner as in the first embodiment.

Next, the operation of the optical head 1 in accordance with the fifth embodiment is described. The laser beam 2a from the semiconductor 2 is collimated by the collimator lens 3, reflected by the mirror 4, and incident upon the incident surface 6a of the transparent condensing medium 6. The collimated beam 2b which was incident upon the incident surface 6a is diffused on the incident surface 6a, the diffused beam 2d is reflected on the shading film 7, the reflected beam 2e is reflected by the reflecting film 11 and condensed on the condense surface 6b to form a beam spot 9 on the condense surface 6b, and a near field wave 10 leaks from the small aperture 7a. The near field wave 10 which has leaked from the small aperture 7a is incident into the recording layer 8a of the recording medium 8, and the beam is served for recording/reading on the recording layer 8a.

According to the optical head 1 in accordance with the above-mentioned fifth embodiment, the recording density in the track direction X is increased as in the first embodiment, and further the condense lens used in the first embodiment is unnecessary, the structure can be simplified. Because the position of the focus point does not change even if the transparent condensing medium 6 expands or shrinks, the optical head 1 is usable under temperature changing conditions without auto focusing servo control. The shading film 7 and the condense surface 6b may have a structure shown in FIG. 4(a) and FIG. 4(b).

Further, because the diameter of the small aperture 7a is less than about 0.2 μm, for example, to form the beam spot at the small aperture 7a having minute aperture precisely, the erroneous of the positioning between the aperture and the beam spot is needed to be at least less than 0.1 μm. Like as shown in the first and second embodiment which use the SIL and condense lens, because the converged beam condensed by the condense lens is incident on the SIL, the fluctuation of the relative position between the incident laser beam, the condense lens and SIL causes the fluctuation of the position where the beam spot is formed. On the other hand, because the optical head described in the third and fifth embodiment which do not use condense lens, by the collimated beam is incident directly to the transparent condensing medium, the fluctuation between the collimated beam and the medium 6 is not influenced to the position where the beam spot is formed. This is advantageous because the less precision in the production is required.

Figure 9A:
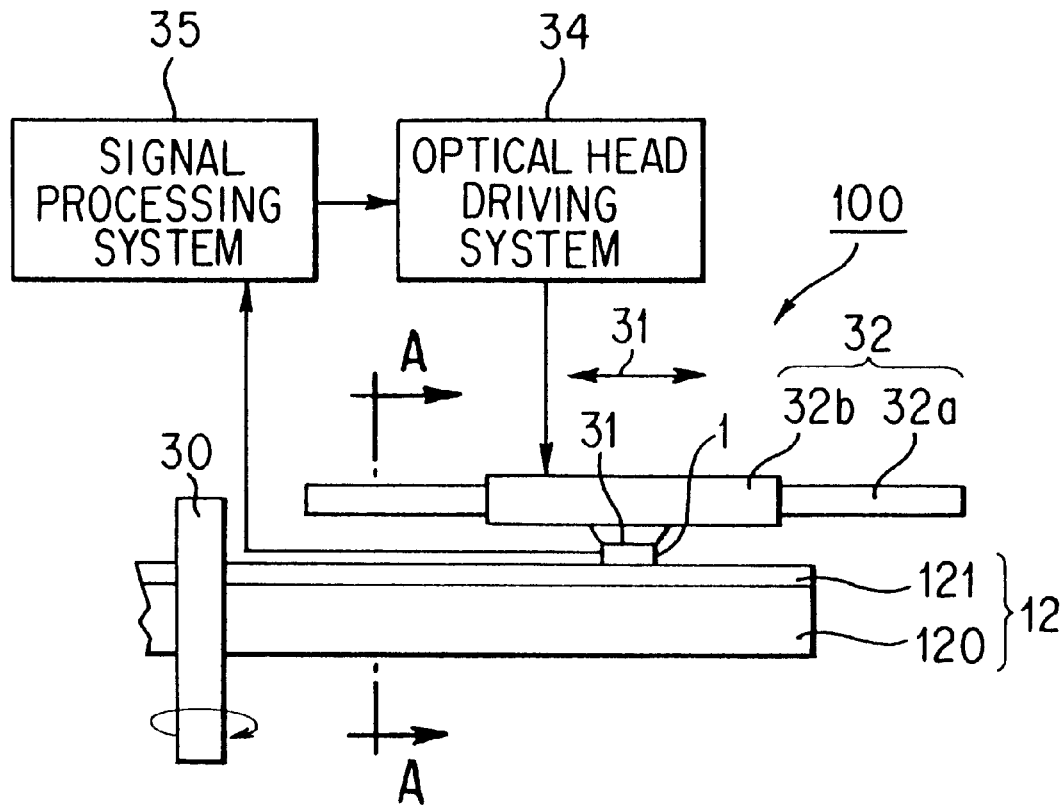
FIG. 9(a) is a diagram for illustrating an optical disk apparatus in accordance with the first embodiment of the present invention.
Figure 9B:
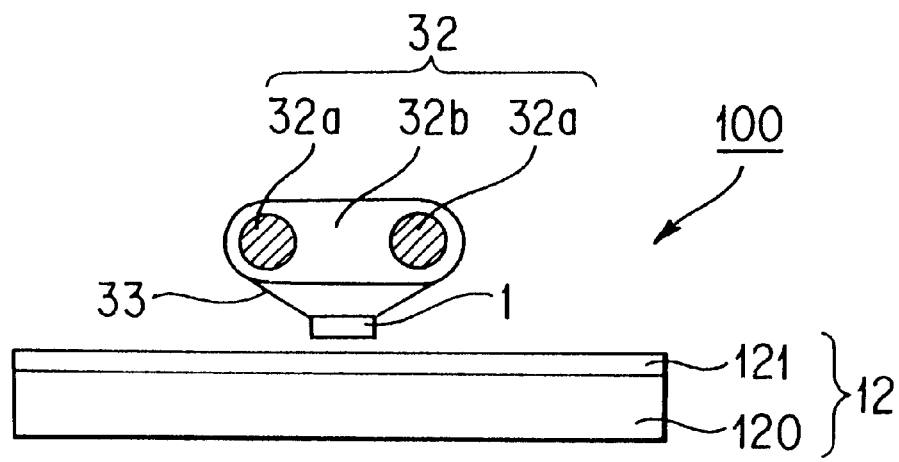
FIG. 9(b) is a cross sectional view along the line A—A in FIG. 9(a).

FIG. 9(a) shows an optical disk apparatus in accordance with the first embodiment of the present invention, FIG. 9(b) is a cross sectional view along the line A—A in FIG. 9(a). The optical disk apparatus 100 is provided with an optical disk 12 comprising a disk-like plastic plate 120 having a recording layer 121 consisting of GeSbTe phase change material formed on one surface which is rotated by a motor not shown in the drawing with interposition of the rotation shaft 30, an optical head 1 for optical recording and optical reproduction on the recording layer 121 of the optical disk 12, a linear motor 32 for moving the optical head 1 in the tracking direction 31, a suspension for supporting the optical head 1 from the side of the linear motor 32 an optical head driving system 34 for driving the optical head 1, and a signal processing system 35 for processing signals obtained from the optical head 1 and for controlling the optical head driving system 34.

The linear motor 32 is provided with a pair of fixed members 32a disposed along the tracking direction 31 and a movable coil 32b which moves on the pair of fixed members 32a. The optical head 1 is supported by the movable coil 32b with interposition of the above-mentioned suspension 33.

Figure 10:
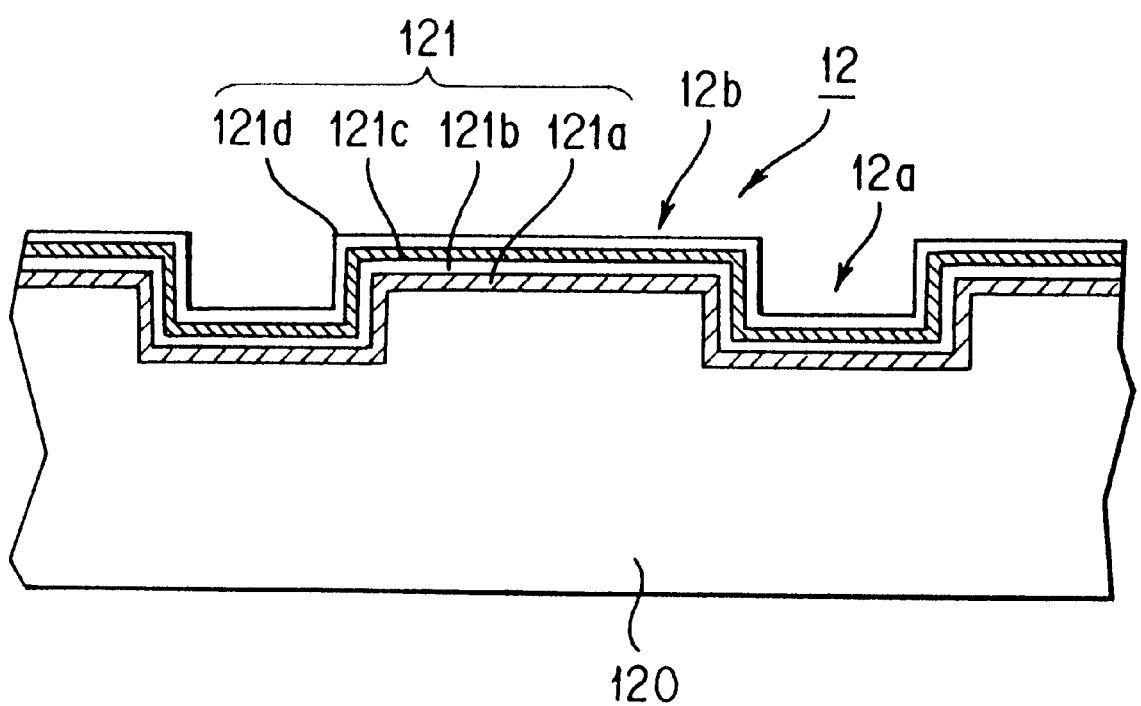
FIG. 10 is a diagram for illustrating in detail the optical disk in accordance with the first embodiment of the present invention.

FIG. 10 shows the detail of the optical disk 12. The optical disk 12 is a high recording density optical disk corresponding to minimization of a near field wave 10 formed by the optical head 1. The plastic plate 120 comprises, for example, a polycarbonate substrate having grooves 12a formed on one side. The optical disk 12 has a recording layer 121 formed by laminating an Al reflecting film layer (thickness of 100 nm) 121a, an $SiO_2$ layer (thickness of 100 nm) 121b, a GeSbTe recording layer (thickness of 15 nm) 121c, and an SiN layer (thickness of 50 nm). In the present embodiment, the information is recorded on lands 12b, the track pitch is 0.07 μm, and the depth of a groove 12a is about 0.06 μm. The mark length is 0.05 μm, the recording density is 130 Gbits/inch$^2$, which corresponds to a 12-cm disk having the recording capacity of 210 GB, this recording capacity is 45 times larger than that of a conventional DVD. Various recording media such as ROM disks having pits, recording/reproduction media which use magneto-optic recording materials and phase change materials, and write once media on which recording is performed by forming pits by beam absorption in colorant may be used.

Figure 11A:
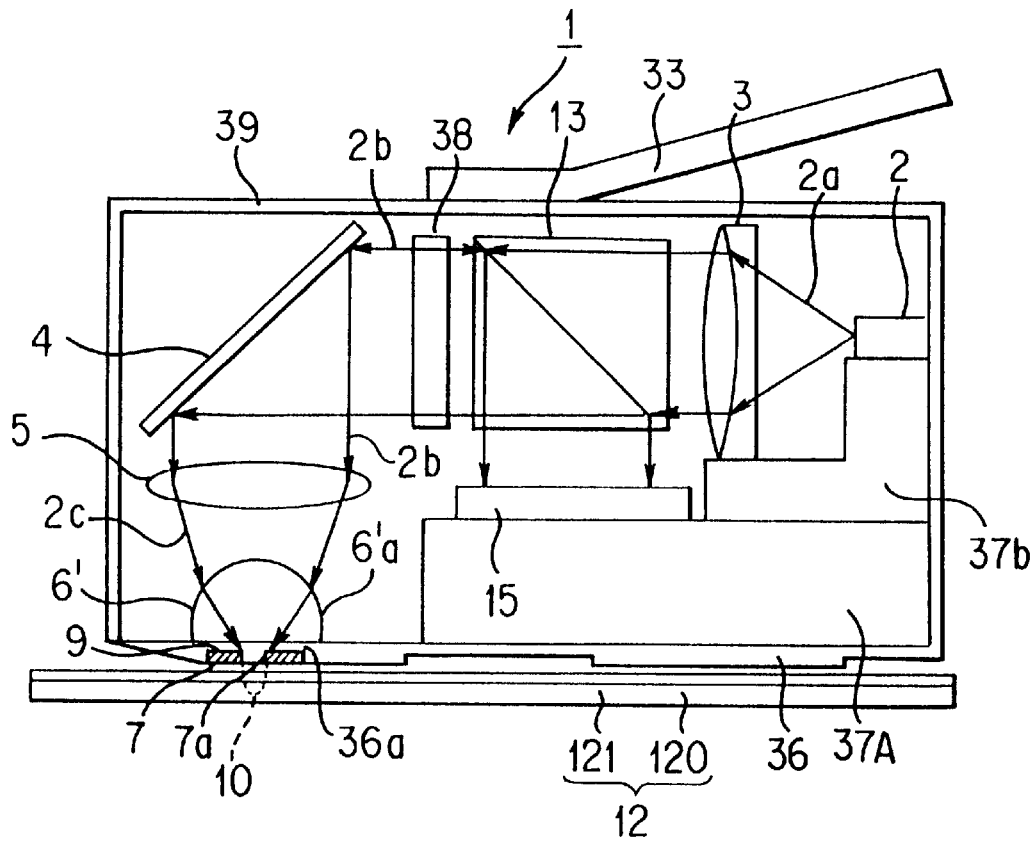
FIGS. 11(a) and 11(b) are diagrams for illustrating the optical head in accordance with the first embodiment.
Figure 11B:
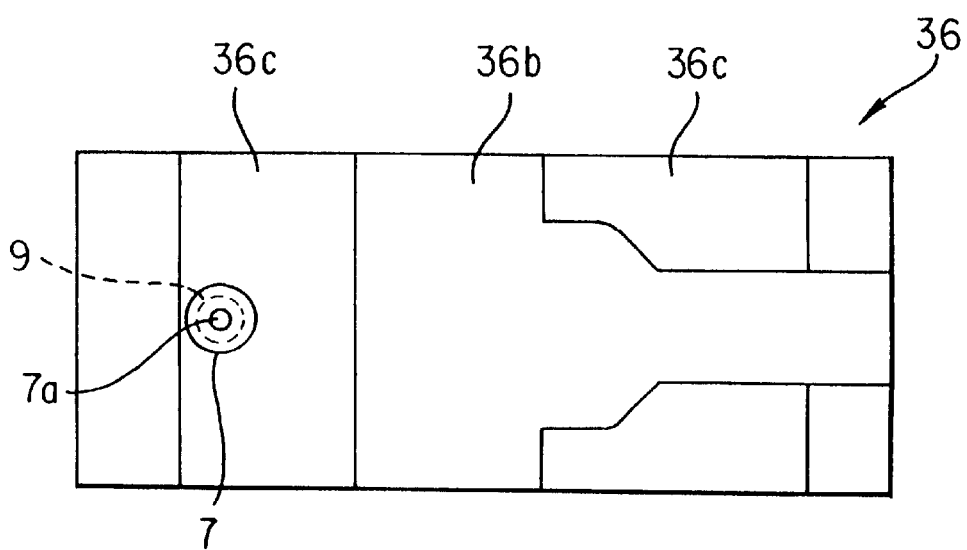

FIG. 11(a) and FIG. 11(b) show the optical head 1 in accordance with the 6th embodiment of the present invention, FIG. 11(a) is a side view and FIG. 11(b) is a bottom view. The optical head 1 has a flying slider 36 which flies on the optical disk 12, and provided on the flying slider 36 are a single edge emitting semiconductor laser 2 consisting of, for example, AlGaInP for emitting a laser beam 2a having a wavelength of 630 nm, a collimator lens 3 that collimates the laser beam 2a emitted from the semiconductor laser 2 into a collimated beam 2b, a seat plate 37A comprising a molten quartz plate mounted on the flying slider 36, a holder 37B comprising a molten quartz plate for fixing the semiconductor laser 2 and collimator lens 3 on the seat plate 37A, a polarized beam splitter 13 for separating the beam into the collimated beam 2b from the semiconductor laser 2 and the reflected beam from the optical disk 12, a quarter wavelength plate 38 for converting the linearly polarized collimated beam 2b from the semiconductor laser 2 to a circularly polarized beam, a mirror 4 for reflecting the collimated beam 2b in the vertical direction, an condense lens 5 and a upper transparent condensing medium 6' for condensing the collimated beam 2b reflected by the mirror 4, and an optical detector 15 mounted on the seat plate 37A to which the reflected beam from the optical disk 12 comes through the beam splitter 13. All components are contained in a head case 39, and the head case 39 is fixed on the end of the suspension 33.

The upper transparent condensing medium 6' consists of, for example, dense flint glass having a refractive index n=1.91, has a diameter of 1 mm, and has a height of about 1.3 mm. The upper transparent condensing medium 6' has the Super SIL structure which is the same as the transparent condensing medium 6 shown in FIG. 1, the flying slider 36 consists of a transparent medium having the same refractive index as that of the transparent condensing medium 6, the bottom surface 36a of the flying slider 36 corresponds to the condense surface 6a, and a beam spot 9 is formed on the bottom surface 36a of the flying slider 36. Therefore one transparent condensing medium 6 is composed of the upper transparent condensing medium 6' and the flying slider 36. A shading film 7 having a small aperture 7a is deposited and formed on the bottom surface 36a of the flying slider 36 in the same manner as shown in FIG. 1.

The flying slider 36 has a groove 36b so that a negative pressure is caused on the area other than the peripheral area of the optical spot 9 formed on the bottom surface 36a as shown in FIG. 11(b). The negative pressure caused by the groove 36b and the spring force of the suspension 33 function to keep the space between the flying slider 36 and the optical disk 12 fixedly, which space is the flying height. The flying height is about 0.06 μm in the present embodiment. The bottom surface 36c is served as a sliding surface. Further, the flying height is very small and at the same time the gap between the top of the projection and the optical disk must be determined precisely. As shown in FIG. 11(a), by forming the top of the projection of the transparent condensing medium 6 and the bottom surface of the flying slider 36 on the same plane, the gap between the projection and the optical disk can be controlled precisely only by adjusting the flying height of the flying slider 36 without colliding to the optical disk and damaged.

The optical head driving system 34 causes phase change between crystalline state and amorphous state in the recording layer 121 by modulation of the output beam from the semiconductor laser 2 correspondingly to recording signals during recording operation, and signals are recorded as the difference in the reflectance during recording, on the other hand, during reproducing operation, the laser beam 2 is irradiated continuously without modulation of the output beam, and the difference in the above-mentioned reflectance on the recording layer 121 is detected by the optical detector 15 as the variation of the reflected beam intensity.

The signal processing system 35 generates an error signal for tracking and data signal based on the reflected beam from the optical disk 12 detected by the optical detector 15, generates a high frequency error signal and a low frequency error signal through a high-pass filter and a low-pass filter respectively from the error signal, and then tracking control is performed on the optical head driving system 34 based on these error signals. The tracking error signal is generated according to Sample Servo System (Optical Disk Technology, Radio Technology Co., P. 95), in which wobbled tracks are marked on tracks intermittently and the error signal is generated based on the reflection intensity change. Because the recording signal and tracking error signal are separated time-divisionally in the case of Sample Servo System, both signals are separated by a gate circuit in a reproducing circuit. The SCOOP method, which uses a photo-sensor with a non-separated photoreceptor for the beam detection, can be well combined with the sample servo system. The error signal may be generated by push-pull system that utilizes interference with the reflected beam from the groove 12a.

Next, the operation of the optical disk apparatus in accordance with the above-mentioned 6th embodiment is described. The optical disk 12 is rotated at a predetermined rotation speed by a motor not shown in the drawing, and the flying slider 36 flies on the optical disk 12 by the action of the negative pressure generated from rotation of the optical disk 12 and the spring force of the suspension 33. A laser beam 2a emitted from the semiconductor 2 driven by the optical head driving system 35 is collimated to a collimated beam 2b by the collimator lens 3, passes through the polarized beam splitter 13 and the quarter wavelength plate 35, and comes to the incident surface 6a of the upper transparent condensing medium 6'. The collimated beam 2b is converted from a linearly polarized beam to a circularly polarized beam by the quarter wavelength plate 38 when passing through the quarter wavelength plate 38. The circularly polarized collimated beam 2b is condensed by the condense lens 5, refracted on the incident surface 6'a of the upper transparent condensing medium 6' and condensed, and condensed on the bottom surface 36a of the flying slider 36. A small beam spot 9 is formed on the bottom surface 36a of the flying slider 36. The partial beam of the beam spot 9 leaks from the small aperture 7a under the beam spot 9 to the outside of the bottom surface 36a of the flying slider 36 as a near field wave 10, and the near field wave 10 propagates in the recording layer 121 of the optical disk 12 and optical recording or optical reproduction is performed. A reflected beam reflected on the optical disk 12 traces the path of the incident beam reversely, refracted on the incident surface 6'a of the upper transparent condensing medium 6' and reflected by the mirror 4, converted to a linear polarized beam having the polarization plane which is 90 degrees different from the incident beam (2a) by the quarter wavelength plate 38, reflected in the direction of an angle of 90 degrees by the polarized beam splitter 13, and enters the optical detector 15. The signal processing system 35 generates an error signal for tracking control and data signal based on the reflected beam from the optical disk 12 which was incident to the optical detector 15, and performs tracking control on the optical head driving system 34 based on the error signal. Because recording/reproduction is performed without automatic focusing control, an automatic focusing control mechanism is unnecessary, and the weight of the optical head 1 is significantly reduced and the size is miniaturized. The optical head 1 has a length of about 8 mm, width of about 4 mm, and height of about 6 mm, and the weight of the optical head 1 is about 0.6 g, the total weight of the movable part including the weight of the movable coil 32b of the linear motor 32 is about 2.0 g, and the frequency band of tracking is 50 kHZ or higher, and the gain is 60 or higher. The decentering of the disk that is minimized to a value as small as 25 $\mu$m allows tracking which satisfies the required accuracy of 5 nm under 600 rpm rotation speed condition. In this case, the ravage transfer rate is 60 Mbps, which allows UGA level video signals to be recorded or reproduced.

According to the optical disk apparatus 100 in accordance with the above-mentioned 6th embodiment, the maximum angle of refraction on the incident surface 6'a of the upper transparent condensing medium 6' is 60 degrees, NA of 0.86 is obtained, as the result, a small beam spot having a spot diameter $D_{1/2}$ of about 0.2 $\mu$m is obtained, and about 20% of the beam spot can be incident on the recording layer 121 of the optical disk 12 as a near field wave 10 through the small aperture 7a having a diameter of 50 nm, and thus the super high density (180 Gbits/inch$^2$) recording/reproduction is realized.

Because by employing Sample Servo System the recording signal and the tracking error signal are separated time-divisionally, a divided-type optical detector 15 is not required, and, for example, a PIN photodiode having a size of 1 mm can be used sufficiently. The optical detector 15 is not necessarily of divided-type, and a detection system is allowed to be simplified and lightweight.

Sample Servo System is used to generate tracking control error signal in the above-mentioned embodiment, however, the wobbled track system, in which the recording track is waved periodically and modulation of the reflected beam intensity due to waving is detected synchronously with the waving frequency to generate an error signal, may be used.

The three-spot system may be used instead as it is used in tracking of a ROM CD. In detail, a diffraction grating is inserted between the collimator lens 3 and the polarized beam splitter 13, optical detection elements for detecting the ± first order reflected beam from the disk are provided on both sides of the main beam detection element, and the error signal is generated based on the difference between outputs.

Push-pull type control, in which unbalance between right and left diffracted beams from the side of the recording track is detected to generate an error signal, may be used. In this case, the diffracted beams are detected by a two-divided type optical detection element, and a differential output error signal is generated.

Further, the optical head 1 in the present embodiment may be used as it is for recording and reproduction on a write once type disk (a disk on which pits are formed by beam absorption of colorant).

Further, the optical head 1 can be used for magneto-optic recording by use of a magneto-optic medium in a manner, in which a thin film coil is provided on the periphery of the beam spot 9 formed on the bottom surface 36a of the flying slider 36 and magnetic field modulation is performed. However, it is necessary to replace the polarized beam splitter 13 with a non-polarized beam splitter and to provide an analyzer before the optical detection element because the rotation of the polarization plane of the beam is detected by a polarization analysis to generate the signal for reproduction.

The edge emitting type laser is used as the laser source in the present embodiment, however, a Vertical Cavity Surface Emitting Laser (VCSEL) may be used. In the case of a surface emitting type laser, though the maximum output in the base mode (TEM00) is as low as about 2 mW, which is 1/10 or smaller than that of the end surface emitting type laser, because in the present embodiment the beam spot diameter is much smaller than that for the conventional optical apparatus and the beam density is ten or more times higher, the surface emitting type semiconductor laser can be used for recording. In the surface emitting type semiconductor laser the wavelength variation due to temperature is small, and the chromatic aberration correction can be omitted.

Figure 12A:
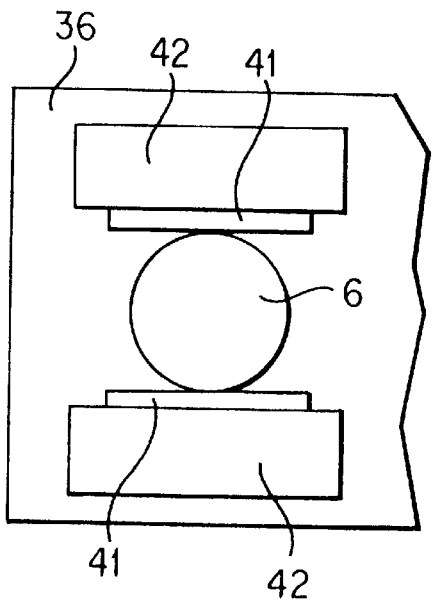
FIG. 12(a) to FIG. 12(c) are diagrams for illustrating the main part of the optical head of an optical disk apparatus in accordance with the second embodiment of the present invention.
Figure 12B:
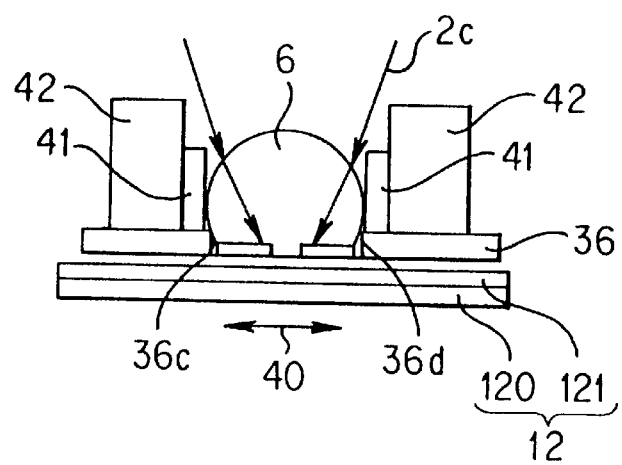
Figure 12C:
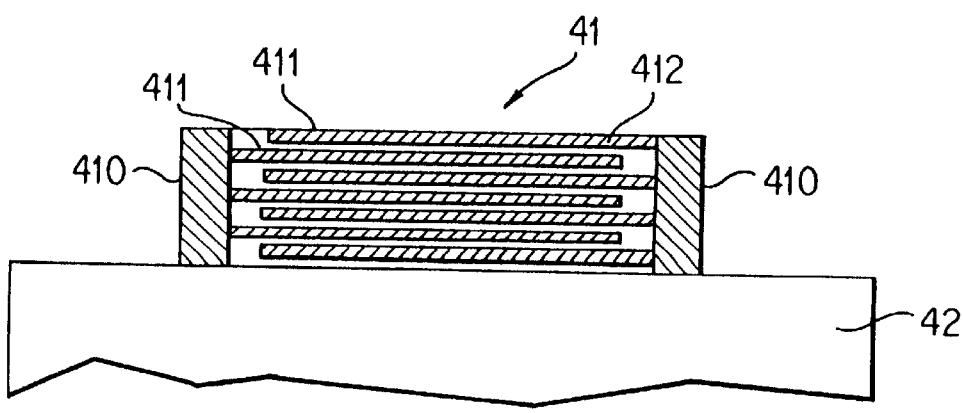

FIG. 12 shows the main part of an optical disk apparatus in accordance with the 7th embodiment. FIG. 12(a) is a partial plan view of a transparent condensing medium 6, FIG. 12(b) is a front view of the same, and FIG. 12(c) is a view of the driver for the transparent condensing medium 6. An optical head 1 of the optical disk apparatus has a install opening 36d 6 on a flying slider 36, for installing the transparent condensing medium and a pair of piezoelectric elements 41 and 41 is provided on the flying slider 36 with holders 42 for scanning the transparent condensing medium 6 in the tracking direction 40. Other components are the same as those used in the optical disk apparatus 100 in accordance with the 6th embodiment. The transparent condensing medium 6 has a condense surface 6b, and the condense surface 6b is disposed so as to be in the almost same plane as the bottom surface 36b of the flying slider 36. The condense surface 6b of the transparent condensing medium 6 may be projected or recessed from the neighboring shading film.

As shown in FIG. 12(c) respectively, each element of the pair of piezoelectric elements 41 and 41 comprises a plurality of electrode films 411 connected to the electrode terminals 410 and 410 and multi-layered PZT thin films (thickness of about 20 μm) 412 formed between electrode films 411. The piezoelectric element 41 is deposited and formed on the holder 42, the pair of piezoelectric elements 41 and 41 support the transparent condensing medium 6 and functions to scan in the direction perpendicular to the beam namely in the tracking direction 40. The deformation direction may be set along the beam direction to set the gap between the condense surface 6b and the optical disk.

According to the above-mentioned optical disk apparatus in accordance with the 7th embodiment, for example, the weight of the transparent condensing medium 6 is as light as 5 mg or lighter, the resonance frequency of the system which supports the transparent condensing medium 6 can be 300 kHz or higher, and the deformation of 0.5 μm or larger is obtained with an applied voltage of 5 V between electrode terminals 410 and 410.

Further, two-step control by use of the piezoelectric element and linear motor 32 enable to obtain a band of 300 kHz at the gain of 80 dB, and the optical disk is tracked with 5 nm accuracy under high rotation speed of 3600 rpm. In the present embodiment, the transfer rate is increased to a rate six times that of the optical disk apparatus 100 in the first embodiment, namely 360 Mbps.

The use of a multi-beam optical head which will be described hereinafter gives a rate eight times higher, and a transfer rate of nearly 3 Gbps is obtained. The average seek speed of 10 ms or faster is achieved for a 12 cm disk. The access time for 3600 rpm rotation is reduced to a value as short as 20 ms or shorter.

Figure 13:
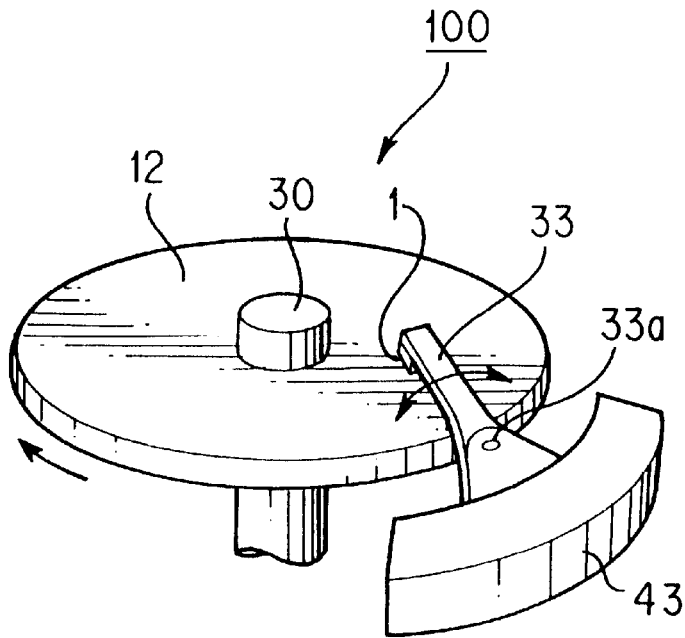
FIG. 13 is a diagram for illustrating an optical disk apparatus in accordance with the third embodiment of the present invention.

FIG. 13 shows an optical disk in accordance with the 8th embodiment of the present invention. Though the linear motor is used for seek operation in the 6th embodiment, however, a rotation type linear motor 43, which is used for a hard disk, is used in the 8th embodiment. The optical head 1 is connected to the rotation type linear motor 43 with interposition of a suspension 33 supported rotatably around a rotatable shaft 33a. The structure described hereinabove allows the rotation type linear motor 43 to be disposed on the outside of the optical disk 12, and the optical head 1 can be made thin and the whole structure of the optical disk apparatus 100 can be miniaturized. Further, the optical disk 12 can be rotated at high speed (3600 rpm), and the average data transfer rate of 360 Mbps or faster is implemented.

Figure 14:
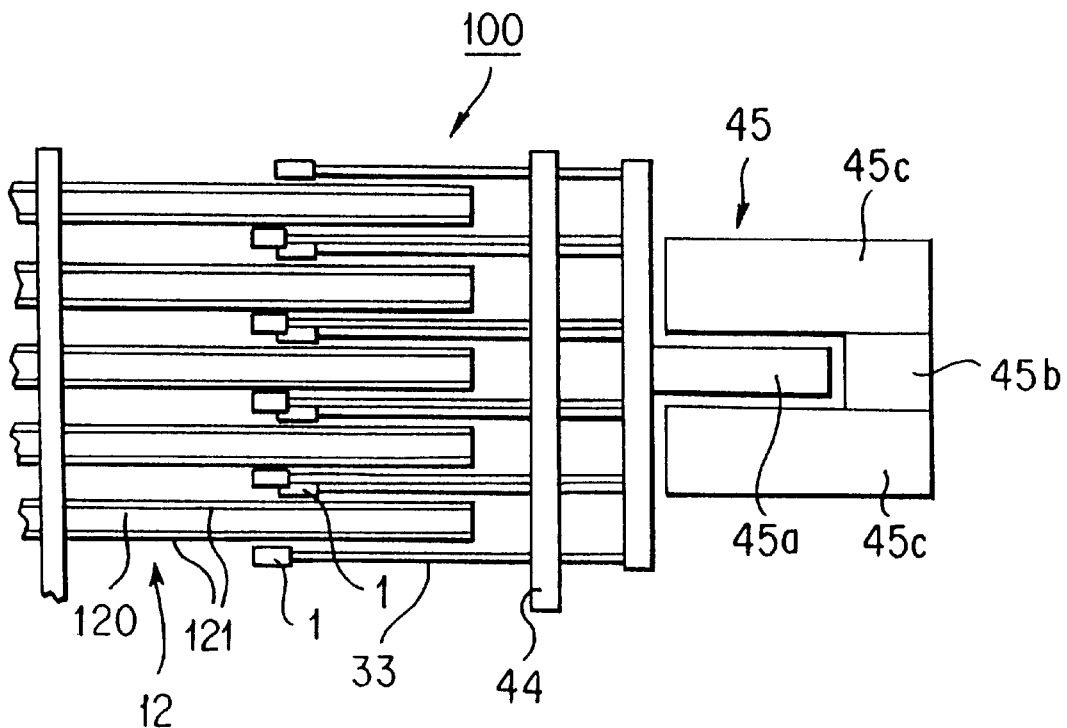
FIG. 14 is a diagram for illustrating an optical disk apparatus in accordance with the fourth embodiment of the present invention.

FIG. 14 shows an optical disk apparatus in accordance with the 9th embodiment of the present invention. In this optical disk apparatus 100, an optical head 1 having the transparent condensing medium 6 is applied to the disk stack type optical disk apparatus having five optical disks, the optical disk apparatus 100 is provided with five optical disks 12, each optical disk has two recording layers 121 and 121 on the top and bottom surface of a plastic substrate 120, 10 optical heads 1 which fly over the recording layers 121 of respective optical disks 12, suspensions 33 which support respective optical heads 1 rotatably with interposition of a rotation axis 44, and a rotation type linear motor 45 for driving the suspensions 33. The recording layer 121 may be a phase change type medium or a magneto-optic medium. The rotation type liner motor 45 comprises a movable member 45a connected to the suspensions 33 and electromagnets 45c and 45c combined with interposition of a yoke 45b for driving the movable member 45a. The structure of this optical head 1 is basically the same as that shown in FIG. 6, the transparent condensing medium 6 having a paraboloid of revolution and AlGaInN-based laser (630 nm) are used, and the beam spot diameter is 0.2 μm. The disk diameter is 12 cm, and the track pitch and mark length are 0.07 μm and 0.05 μm respectively, the capacity per one surface is 300 GB.

According to the optical disk apparatus 100 in accordance with the above-mentioned 9th embodiment, the information is recorded on five optical disks 12, and the capacity as large as 3 TB is implemented.

The optical head 1 shown in FIG. 6 or FIG. 7 may be use. Thereby the height of an optical head can be 3 mm or lower, the height of an optical disk apparatus can be lowered and the capacity per volume is increased.

Figure 15:
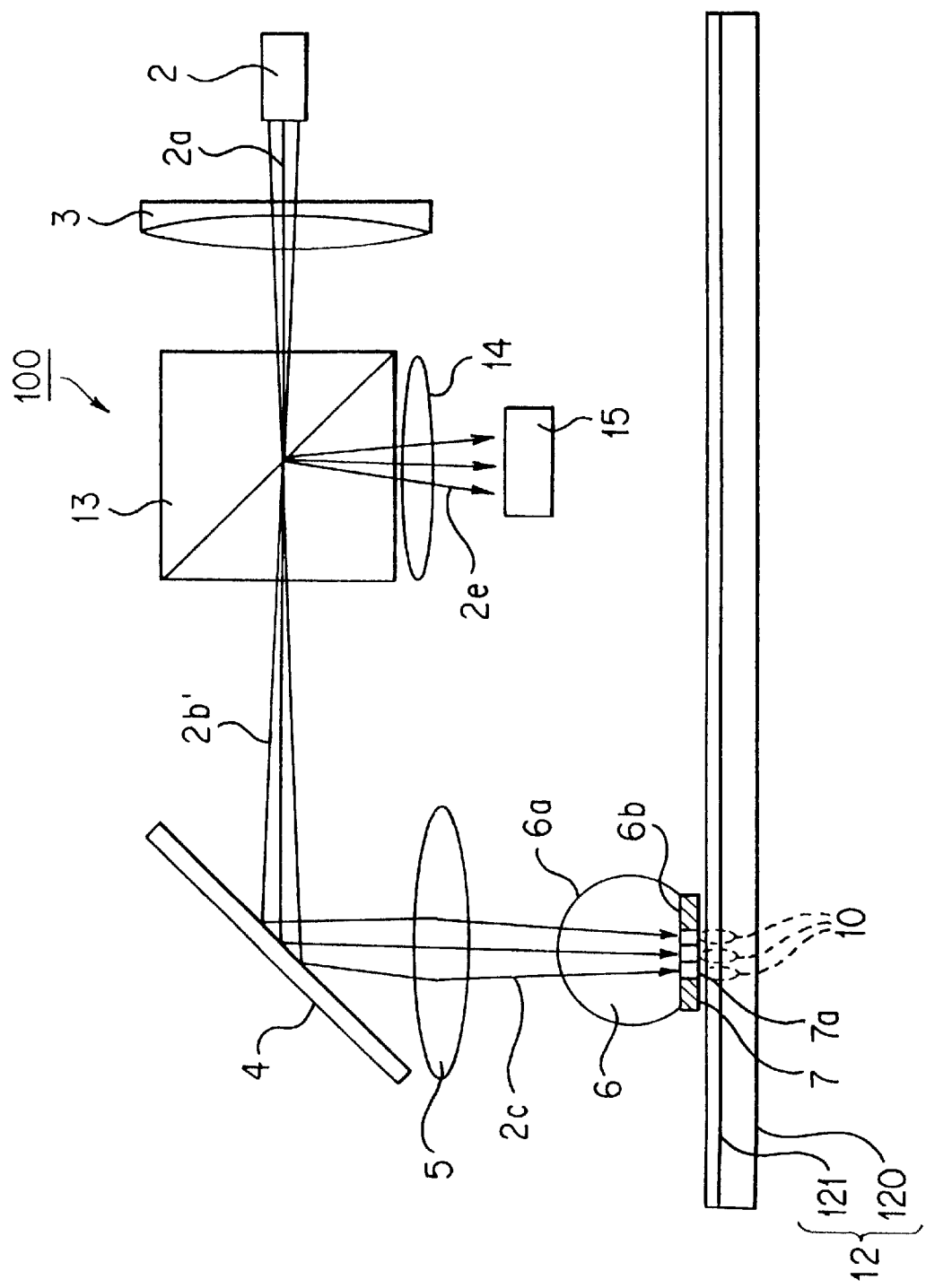
FIG. 15 is a diagram for illustrating the main part of an optical disk apparatus in accordance with the fifth embodiment of the present invention.

FIG. 15 shows the main part of an optical disk apparatus in accordance with the 10th embodiment of the present invention. The optical disk apparatus 100 is provided with a plurality of independently drivable laser elements (for example, eight), and provided with a semiconductor laser 2 in which a plurality of laser beams 2a are emitted from a plurality of respective laser elements, a collimator lens 3 for collimating the laser beams 2a from the semiconductor laser 2 to incident beams 2b', a mirror 4 for reflecting the incident beams 2b' in the predetermined direction, an condense lens 5 for condensing the incident beams 2b' reflected by the mirror 4, a transparent condensing medium 6 to which the condensed beams 2c' condensed by the condense lens 5 are incident and in which a plurality of beam spots 9 are formed on the condense surface 6b, which has the same structure as shown in FIG. 1, a shading film 7 having a plurality of small apertures 7a formed by deposition on the surface of the condense surface 6b of the transparent condensing medium 6, an optical disk 12 having a recording layer 121 consisting of GeSbTe phase changing material on one side of a disk-shaped plastic plate 120 which is rotated by a motor not shown in the drawing, a polarized beam splitter 13 for separating the beam reflected on the optical disk 12 from incident beams 2b', and eight-divided optical detector 15 to which laser beams 2e separated by the beam splitter 13 are incident through a condenser lens 14.

Figure 16:
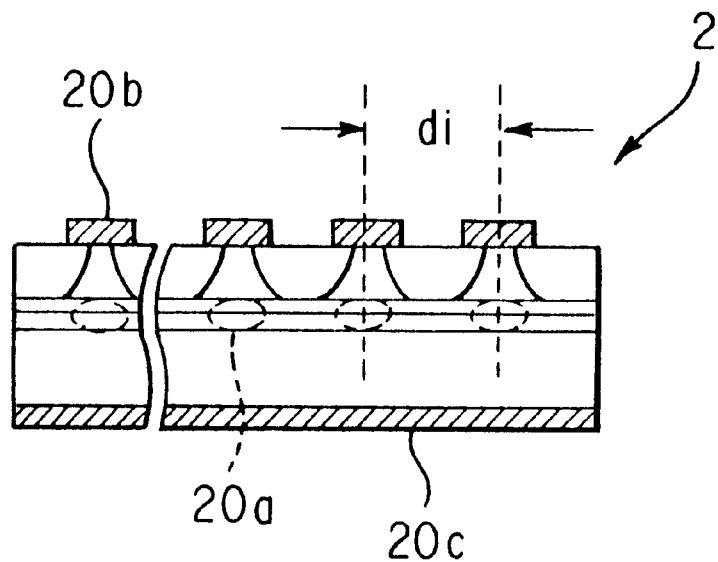
FIG. 16 is a diagram for illustrating a semiconductor laser in accordance with the fifth embodiment.

FIG. 16 shows the semiconductor laser 2. The semiconductor laser 2 is an edge emitting semiconductor, and has active layers 20a, p-type electrodes 20b, and n-type electrode 20c. The interval $d_1$ of the p-type electrodes 20b is prescribed to be, for example, 15 μm, and the interval of the laser beams 2a is set to be 15 μm resultantly.

Figure 17:
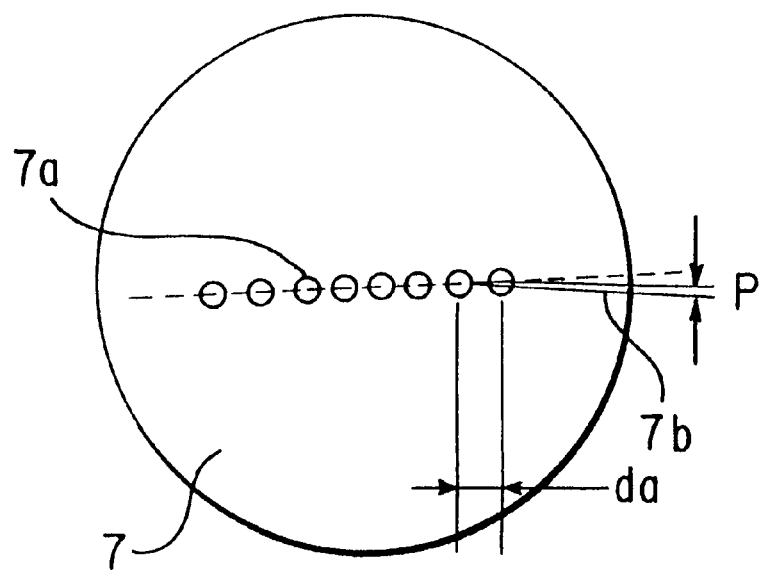
FIG. 17 is a diagram for illustrating a shading film in accordance with the fifth embodiment.

FIG. 17 shows the shading film 7. The shading film 7 has eight small apertures 7a correspondingly to the number of laser beams 2a. Because the NA of the collimator lens 3 is 0.16, NA of the transparent condensing medium 6 is 0.8, and the interval $d_1$ of the laser beams 2a is 15 μm, the interval of the beam spots 9 on the condense surface 6b namely the interval $d_2$ of the small apertures 7a is 3 μm. The array axis direction 7b of the small apertures 7a is slightly deviated from the track of the optical disk 12 so that the respective small apertures 7a are positioned just above adjacent tracks. In detail, the interval of the respective adjacent small apertures 7a in the perpendicular direction to the recording tracks is arranged so as to be equal to the track pitch (in this case, 0.07 μm). The inclination angle between the array axis direction 7b of the small apertures 7a and the tracks (omitted) is 23 milliradian, the inclination is adjusted by controlling the inclination of the support for the laser array and by controlling photolithography during forming for the small aperture array.

Next, the operation of the optical disk apparatus 100 in accordance with the above-mentioned 10th embodiment is described. A plurality of laser beams are emitted from the semiconductor laser 2, the plurality of laser beams 2a from the semiconductor laser 2 are collimated by the collimator lens 3 to form a prescribed incident beams 2b', the incident beams 2b' pass through the polarized beam splitter 13 and reflected by the mirror 4, and condensed by the condense lens 5, refracted on the incident surface 6a of the transparent condensing medium 6 and converted on the condense surface 6b. A plurality of beam spots 9 are formed on the condense surface 6b. A plurality of near field waves 10 leak from the plurality of respective small apertures 7a under the plurality of respective beam spots 9, and the near field waves 10 propagate in the recording layer 121 of the optical disk 12 and are served for optical recording or optical reproduction. The reflected beams reflected on the optical disk 12 return reversely on the path of the incident beams, are refracted on the incident surface 6a of the transparent condensing medium 6 and reflected by the mirror 4, separated from the incident beams 2b' by the polarized beam splitter 13, and condensed into the eight-divided optical detector 15 by the converting lens 14.

According to the optical disk apparatus 100 in accordance with the above-mentioned 10th embodiment, the eight near field waves 10 which can be modulated independently of each other from the respective eight small apertures 7a are served independently for recording/reproduction simultaneously on respective eight recording tracks, the recording/reproduction transfer rate is increased eight times. Because the array length of the small apertures is about 20 $\mu$m and the bend of the track corresponding to the array length is as small as 0.007 $\mu$m, which is 1/10 of the track width, the track deviation due to the track bend is negligible. The number of small apertures is not limited to eight, may be increased or decreased depending on the use. The transparent condensing medium 6, such as shown in FIG. 4, FIG. 5, FIG. 6, or FIG. 7 may be used.

Further, exposing the plural apertures with one beam spot and using the near field waves leaked from these apertures, the frequency range of the tracking can be reduced. Furthermore, the edge emitting type semiconductor laser generates plural emission points along the active layer 20a of the semiconductor laser, as shown in FIG. 16, because the row of the beams depend on the direction of the semiconductor laser element, in other words, depending on the direction of the active layer, the direction can be selected arbitrary. Also in a single beam type of the edge emission semiconductor laser, because the beam becomes oval shape along the active layer, then the direction of the active layer can be selected properly, either.

Figure 18:
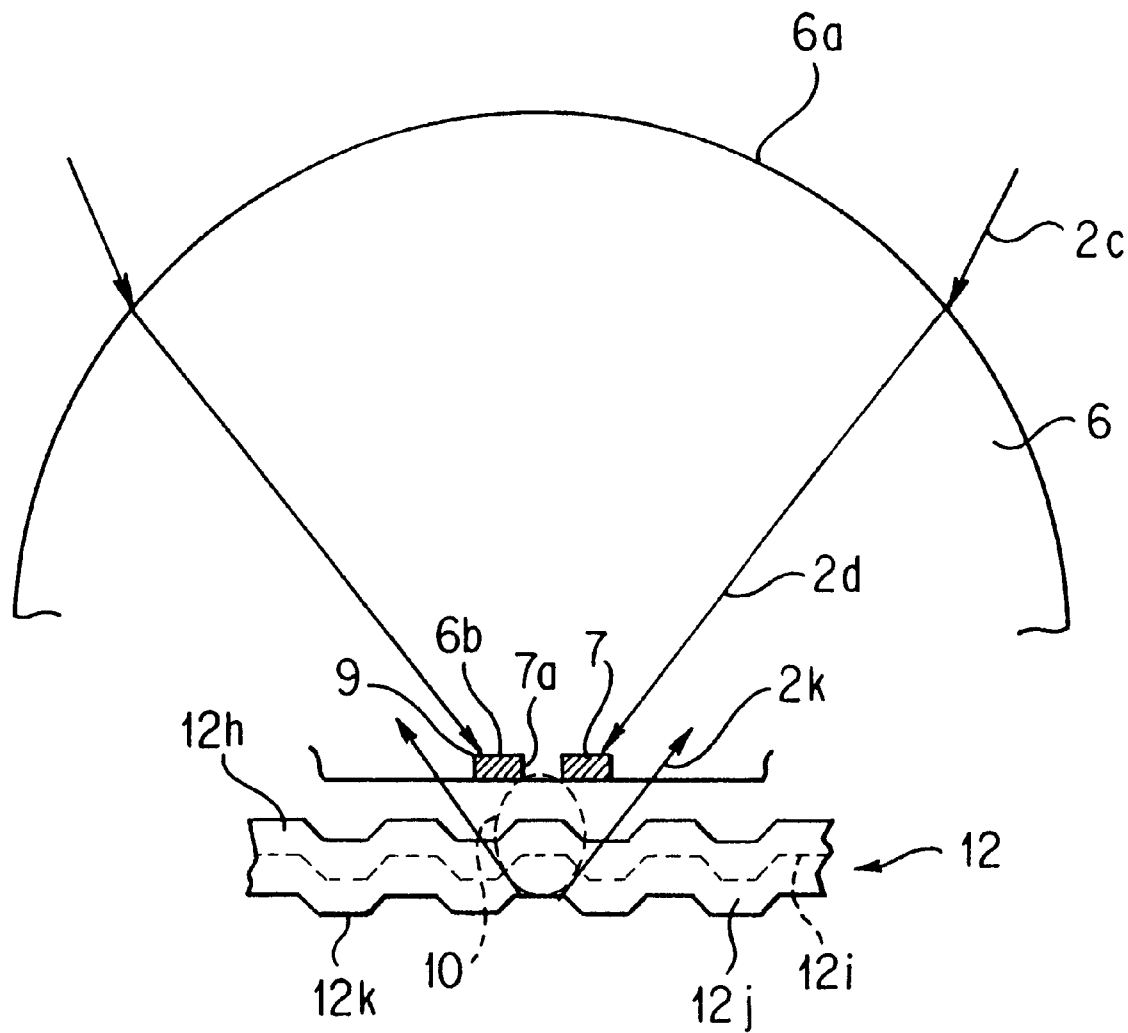
FIG. 18 is a diagram for illustrating the main part of the optical head of an optical disk apparatus in accordance with the sixth embodiment of the present invention.

FIG. 18 shows an optical disk apparatus in accordance with the 11th embodiment of the present invention. An optical head 1 of the optical disk apparatus is different from the optical head 1 shown in FIG. 1 in the outside diameter of the shading film 7, and other structures are the same as those shown in FIG. 1. The periphery of the shading film 7 has a diameter slightly larger than that of the condensed beam 2c, which corresponds to the diameter of the condensed beam spot on the condense surface. The optical disk 12 is provided with a protective film 12h, a recording layer 12i, an interference layer 12j, and reflecting layer 12k. In the present embodiment, the total thickness of the protective film 12h, recording layer 12i, interference layer 12j, and reflecting layer 12k is about 100 nm, and the distance between the protective film 12h and the small aperture 7a is about 50 nm.

Next, the operation of the optical head 1 in accordance with the above-mentioned sixth embodiment is described. The condensed beam 2c from the condense lens is refracted on the spherical incident surface 6a of the transparent condensing medium 6, and the refracted beam 2d is condensed on the condense surface 6b. A beam spot 9 is formed on the condense surface 6b. The near field wave 10 which leaks from the small aperture 7a of the shading film 7 enters and propagates in the optical disk 12, and is reflected by the reflecting layer 12k of the optical disk 12. The reflected beam 2k reflected by the reflecting layer 12k passes not only the small aperture 7a of the shading film 7 but also the outside of the shading film 7 to enter the optical detector through the transparent condensing medium 6 and the condense lens.

The intensity distribution of a near field wave 10 from a small aperture 7a is approximated to the intensity distribution 1 in the case that the small aperture 7a is assumed to be a perfect diffusing surface in the recording medium. In this case, the broadening of the beam is maximized, and the angular distribution is represented by Cos $\theta$. The beam is reflected by the reflecting film 12k in the direction of the transparent condensing medium 6 with the distribution unchanged. Assuming that the viewing angle of the contour of the small aperture 7a and shading film 7 are $\theta_1$ and $\theta_2$ respectively, then the proportion $I_{r1}/I_0$ of the beam which returns to the small aperture 7a and the proportion $I_{r2}/I_0$ of the beam which returns to the peripheral area are represented respectively by the following equations (7) and (8), where the transmittance of the small aperture 7a is denoted by Tn, and the medium reflectance is denoted by Rb.

[Expression 2]

$$I_{r1}/I_0 = Tn \times Rb \times \int_0^{2\pi} \int_0^{\theta_1} \cos\theta d\theta \cdot d\phi = 2\pi \times Tn \times Rb \times [\sin\theta]_0^{\theta_1} \quad (7)$$

[Expression 3]

$$I_{r2}/I_0 = Tn \times Rb \times \int_0^{2\pi} \int_{\theta_2}^{\pi/4} \cos\theta d\theta \cdot d\phi = 2\pi \times Tn \times Rb \times [\sin\theta]_{\theta_2}^{\pi/4} \quad (8)$$

The small aperture 7 having a diameter of 50 nm gives Tn of 0.15 and Rb of about 0.2 for the phase change medium, therefore the outside diameter of the shading film of 0.2 $\mu$m gives $I_{r1}/I_0$ of 0.0025 and $I_{r1}/I_0$ of 0.02. As the result, it is possible to improve the intensity about ten times by introducing the beam of the peripheral area of the shading film 7. The smaller the diameter of the small aperture 7a is, the more effective. Because the beam of the peripheral area is refracted on the incident surface 6a of the transparent condensing medium 6 and enters the internal and the beam which has returned from the small aperture 7a diffuses around the small aperture 7a, the directivities of both beams are slightly different from each other, however the diameter of the transparent condensing medium 6 of about 1 mm is sufficiently larger than the film thickness (150 nm) of the small aperture 7a and recording medium, thus the difference is negligible, it is possible to introduce both beams together into the optical detector, and the reflected beam intensity is increased.

Figure 19:
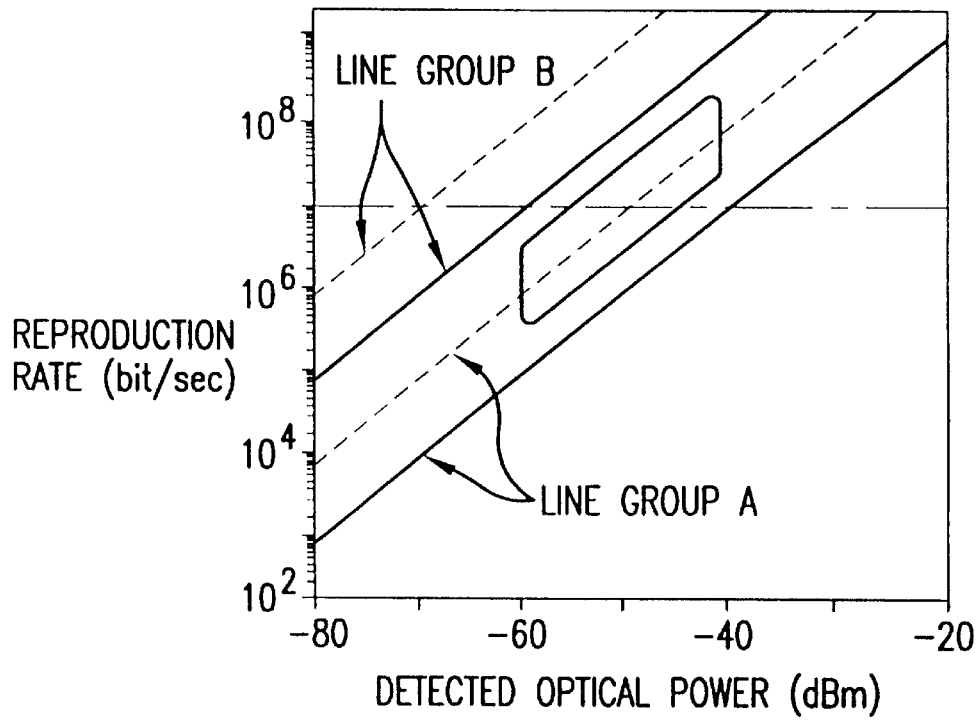
FIG. 19 is a graph for describing the relationship between the detected optical power and reproduction rate.
Figure 23:
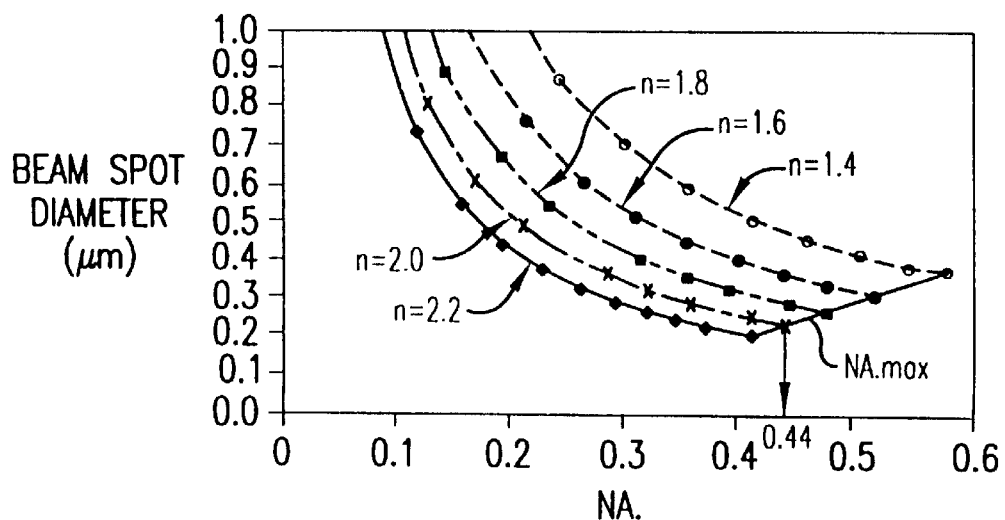
FIG. 23 is a graph for describing the relationship between the refractive index n and NA.

FIG. 19 shows the relationship between the detected optical power which is required for maintaining the code error rate of 1×10$^{-9}$ and the reproduction rate. In FIG. 19, the solid line represents a duty ratio of 0.1 and the broken line represents a duty ratio of 1, and the line group A represents the quantum efficiency of the optical detector of 0.1 and the line group B represents the quantum efficiency of the optical detector of 1. The detected optical power in the present embodiment is about −30 bBm, so the reproduction rate can be 10$^9$ bit/sec or higher. (G. Ohtsu, Electronics, the issue of May 1996, p.92)

Figure 20A:
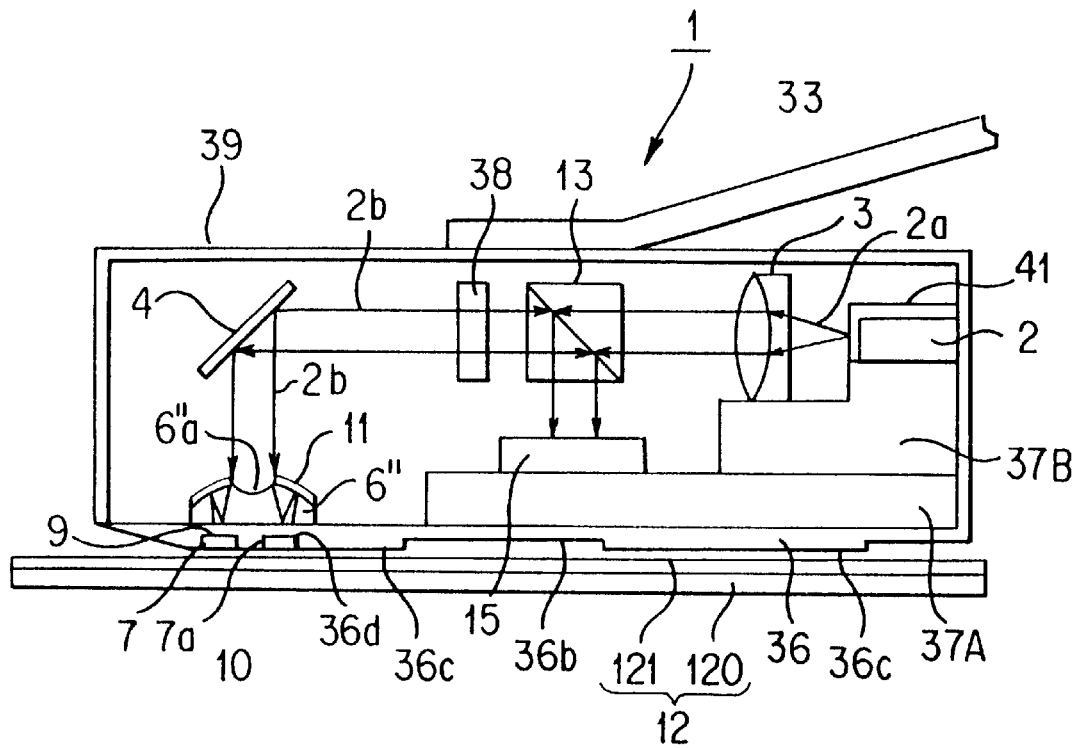
FIG. 20(a) is a vertical cross sectional view of the optical head of an optical disk apparatus in accordance with the seventh embodiment of the present invention.
Figure 20B:
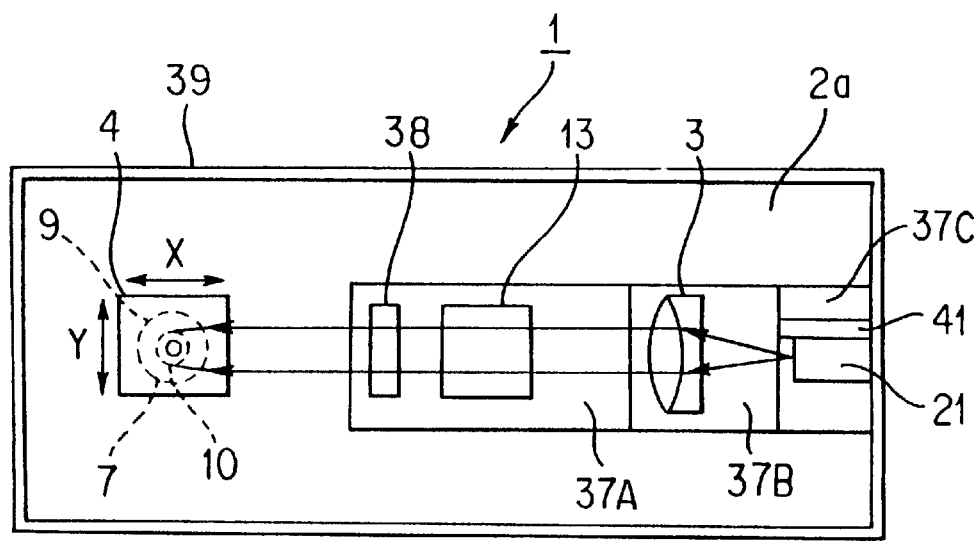
FIG. 20(b) is a horizontal cross sectional view of the optical head shown in FIG. 20(a).
Figure 21A:
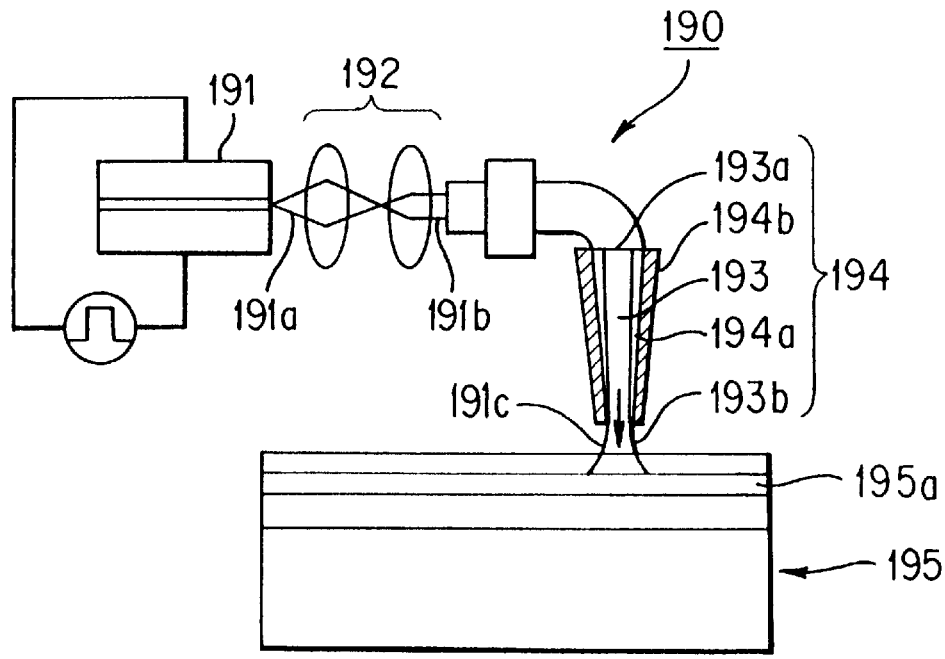
FIG. 21(a) is a diagram for illustrating a conventional optical disk apparatus.
Figure 21B:
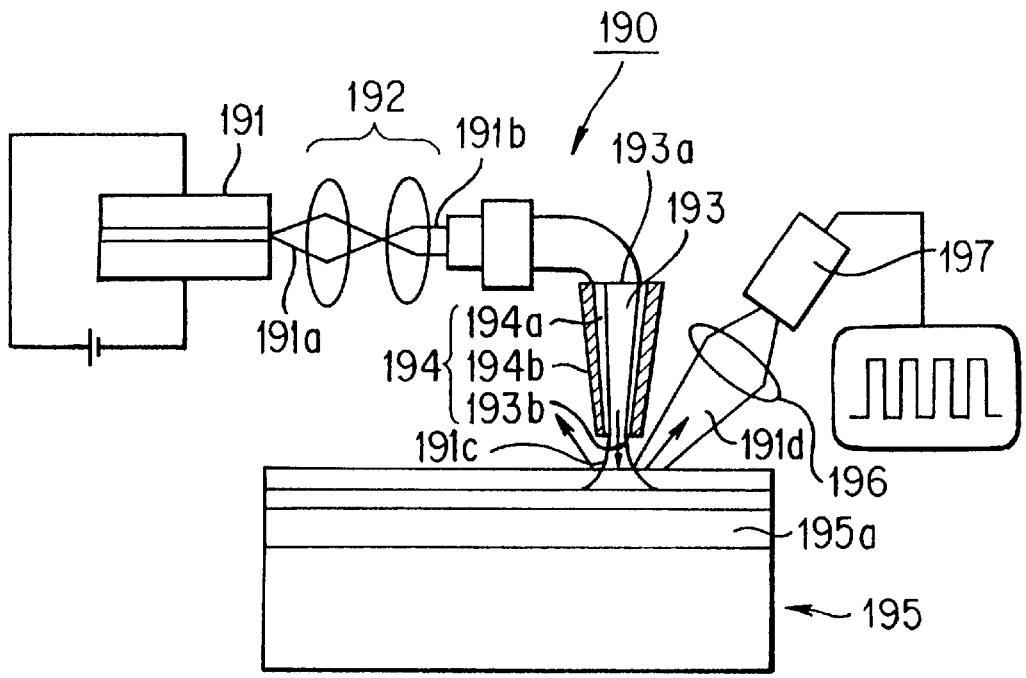
FIG. 21(b) is a diagram for illustrating the reproduction operation of the conventional optical disk apparatus shown in FIG. 21(a).
Figure 22:
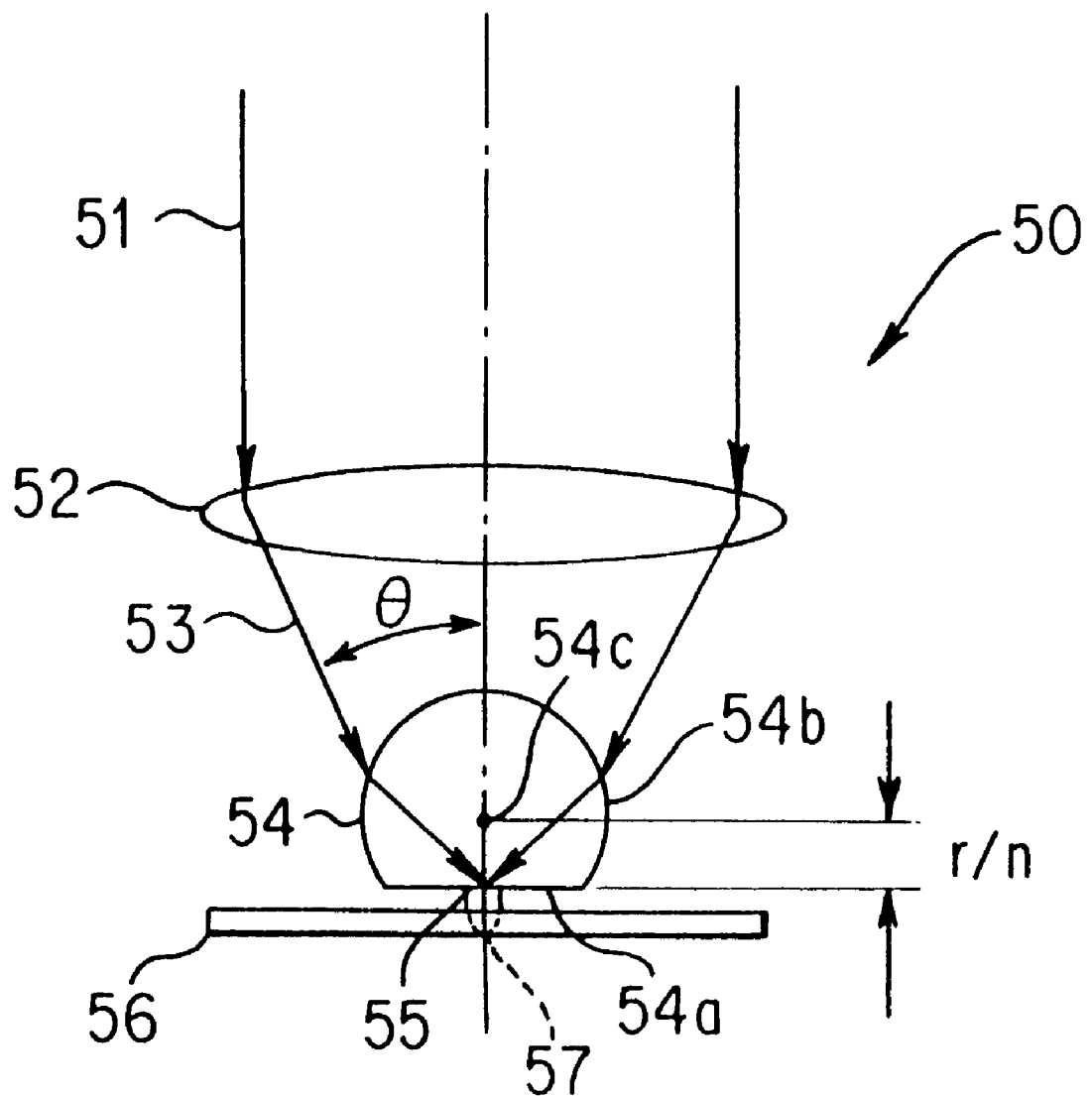
FIG. 22 is a diagram for illustrating an optical head of another conventional optical disk apparatus.
Figure 24:
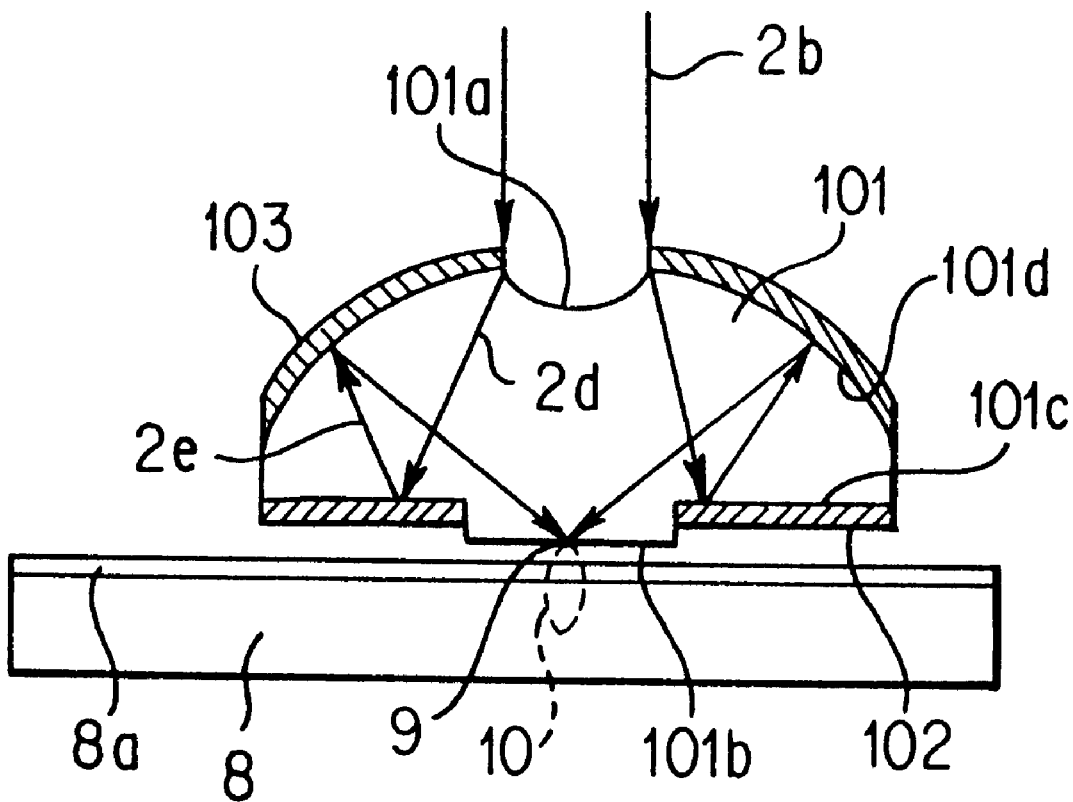
FIG. 24 is a diagram for illustrating a conventional optical head.

FIG. 20 shows an optical head of an optical disk apparatus in accordance with the 12th embodiment of the present invention. FIG. 20(a) is a vertical cross sectional view and FIG. 20(b) is a horizontal cross sectional view. In the present embodiment, the optical head 1 shown in FIG. 8 is applied to the optical disk apparatus 100 shown in FIG. 9. The optical head 1 has a flying slider 36 which flies on the optical disk 12, and provided on the flying slider 36 are an end surface emitting type semiconductor laser 2 consisting of, for example, AlGaInP for emitting a laser beam having a wavelength of 630 nm, a collimator lens 3 for collimating the laser beam 2a emitted from the semiconductor laser 2 into a collimated beam 2b, a holder 37A comprising a molten quartz plate mounted on the flying slider 36, a holder 37B comprising a molten quartz plate for fixing the semiconductor laser 2 and collimator lens 3 on the holder 37A, a holder 37C for holding the semiconductor laser 2 with interposition of a piezoelectric element 41, a polarized beam splitter 13 for separating the beam into the collimated beam 2b from the semiconductor laser 2 and the reflected beam from the optical disk 12, a quarter wavelength plate 38 for converting the linearly polarized collimated beam 2b from the semiconductor 2 to a circularly polarized beam, a mirror 4 for reflecting the collimated beam 2b in the vertical direction, a transparent condensing medium 6 for condensing the collimated beam 2b reflected by the mirror 4 shown in FIG. 8, a reflecting layer 11 deposited on the reflecting surface 6e of the transparent condensing medium 6, and an optical detector 15 fixed to the seat plate 37 A for receiving the reflected beam from the optical disk 12 through the beam splitter 13. All components are contained in a head case 39, and the head case 39 is fixed to the end of the suspension 33. A shading film 7 having a small aperture 7a is formed by deposition on the bottom surface 36a of the flying slider 36 in the same manner as shown FIG. 8.

According to the optical disk apparatus 100 in accordance with the 12th embodiment, a near field wave which leaks from the beam spot 9 formed on the bottom surface 36a of the flying slider 36 to the outside passes through the small aperture 7a, thereby enabling super-high density optical recording/reproduction as described in the explanation of the optical disk apparatus 100 of the first embodiment and miniaturization of the optical head 1 in the height direction. The optical head 1 may be applied to the optical disk apparatus 100 such as shown in FIG. 13, FIG. 14, and FIG. 15.

Further, the optical head can be composed as so-called separate type, which the heavy parts, such as laser and photo-detector, is provided on a stationary portion and on the movable portion the parts which has to be set on the movable portion, such as transparent condensing medium and slider, are installed. However, as described before, the optical head of this invention need a precise positioning of the aperture and the beam spot on the condense surface with the degree of less than 0.1 μm. The separate type may be difficult enough to adjust the stationary portion and the movable portion with such accuracy, because the up and down motion of the surface of the optical disk, the vibration of the movable portion or the deformation of installed parts by the thermal alteration. Therefore at least the laser and the transparent condensing medium is preferred to be installed on a same body such as moving together. Then the difference of the position between the beam spot and the aperture caused by these fluctuation or the deformation can be improved.

The method to detect the information recorded on the disk can be applied not only the method to detect the reflecting beam from the optical disk as shown in the embodiments, but also the method to detect the information magnetically such as the well-known GMR (Gigantic Magnetic Resistive) sensor, of course.

In the embodiments above, the optical element, such as a collimator, a reflector, a condense lens and a transparent condensing medium, consists of one part, but the optical element can be composed of plural parts, at least while the condition that the beam spot is condensed on the surface of the transparent condensing medium and the aperture is positioned at the beam spot is satisfied.

Further, when the spot is formed on the transparent condensing medium by a reflector, the gap between the reflector and the transparent condensing medium may be allowable, but to prevent the spherical aberration the reflector and the transparent condensing medium are adhered to each other without the air gap. The reflector may be a cast made from, for example, the metal, but the film is preferable to improve the adherence to the medium.

The shade is not limited to the film, such as described in the embodiments. The minimum requirement is the film enable the near field wave to leak from its aperture. Therefore the shade can be an adhesive thin sheet or the periphery of the aperture on the transparent condensing medium which is chemically treated as to shade the beam substantially. Because of the thinness of the shade and the preciseness of the formation of the aperture the shade film is preferred.

According to the present invention, as described hereinbefore, a near field wave which leaks from a beam spot formed on a condense surface to the outside of a transparent condensing medium is diaphragmed by a small aperture, thereby enabling minimization of the near field wave spot formed on a recording medium. As the result, high recording density of a recording medium is implemented.

Because condensing the beam on the condense surface of the transparent condensing medium and obtaining the near field wave from the aperture located at where the beam is condensed, the high optical utilization efficiency factor is obtained. The high optical utilization factor allows use of a small-sized lightweight beam source and an optical detector, thereby enabling miniaturization of the optical head and optical disk apparatus, and improvement of the data transfer rate.

What is claimed is:

1. An optical head, comprising:
   a laser emitting a laser beam;
   a transparent condensing medium having a condense surface on which the condensed laser beam forms a beam spot; and
   a shade provided on the transparent condensing medium and having an aperture, wherein the aperture is positioned at which the beam spot is formed and an area of the aperture is smaller than a size of the beam spot,
   wherein the transparent condense medium further includes a projection positioned in the aperture for recording and/or reproducing by applying a near-field wave leaked from the projection.

2. An optical head recited in claim 1, wherein the projection tapers.

3. An optical head recited in claim 1, further comprising an optical condense element separated from the transparent condensing medium.

4. An optical head recited in claim 3, wherein the optical condense element comprises a reflector.

5. An optical head recited in claim 4, wherein the reflector is adhered to a surface of the transparent condensing medium.

6. An optical head recited in claim 2, wherein the transparent condensing medium comprises a Solid Immersion Lens.

7. An optical head recited in claim 3, wherein the optical condense element comprises a condense lens;

the transparent condensing medium comprises a partial spherical surface and has an incident surface on which the laser beam condensed by the condense lens is incident; and the condense surface is positioned on an axis passing through a center of the spherical surface.

8. An optical head recited in claim 2, wherein the transparent condensing medium has an incident surface on which the laser beam condensed by the condense lens is incident, the incident surface have an optical power.

9. An optical head recited in claim 2, wherein the transparent condensing medium comprises a Super Solid Immersion Lens.

10. An optical head recited in claim 3, wherein the optical condense element comprises a condense lens; and the transparent condensing medium comprises a partial spherical surface and has an incident surface on which the laser beam condensed by the condense lens is incident and which refracts the incident laser beam, and the condense surface is positioned on r/n (r donates the radius of the spherical surface, and n denotes the refractive index of the transparent condensing medium) distant from the center of the spherical surface.

11. An optical head recited in claim 1, the projection having a top surface where the near-field wave leaks from, wherein the top surface and a surface of the shade form an almost flat surface.

12. An optical head recited in claim 3, wherein the optical condense element comprises a reflecting film; and the transparent condensing medium has a concave incident surface on which the laser beam is incident, and a aspheric surface coated with the reflecting film surrounded the incident surface, wherein the incident laser beam is reflected at the shade and the reflected laser beam reflected at the shade is reflected by the reflecting film to form the beam spot on the condense surface.

13. An optical head recited in claim 3, wherein the optical condense element is positioned behind the transparent condensing medium on an optical path of the laser beam being incident from the incident surface and changes the optical path toward a direction intersecting a direction of the laser beam at which the laser beam is incident of the transparent condensing medium.

14. An optical head recited in claim 13, wherein the optical condense element comprises a reflector.

15. An optical head recited in claim 13, wherein the incident surface of the transparent condensing medium is planar.

16. An optical head recited in claim 13, wherein the incident surface and the condense surface are planar and are orthogonal each other.

17. An optical head recited in claim 1, wherein the transparent condensing medium has an incident surface on which the laser beam is incident, a reflect surface which reflects the laser beam being incident through the incident surface, and an condense surface on which the reflected laser beam condenses to form the beam spot.

18. An optical head recited in claim 17, wherein the reflect surface constitutes a part of a paraboloid of revolution.

19. An optical head recited in claim 17, further comprising a reflecting film attached on the reflection surface.

20. An optical head recited in claim 19, wherein the reflect surface is planar, and the reflecting film is a reflecting type volume hologram.

21. An optical head recited in claim 19, wherein the reflect surface is planar, and the reflecting film is a reflecting type binary hologram.

22. An optical head recited in claim 2, wherein the transparent condensing medium consists of a material having a refractive index larger than 1.

23. An optical head recited in claim 2, wherein the transparent condensing medium is made of a glass.

24. An optical head recited in claim 2, wherein the transparent condensing medium is made of a crystalline material.

25. An optical head recited in claim 2, wherein a width of the aperture is smaller than the wavelength of the laser beam.

26. An optical head recited in claim 2, wherein the shade has a thickness smaller than the wavelength of the laser beam.

27. An optical head recited in claim 2, wherein the shading film is embedded in the transparent condensing medium.

28. An optical head recited in claim 1, further including a base which fixes at least the transparent condensing medium and the laser, wherein the base scans over a disk to read and/or write data.

29. An optical head recited in claim 1, further includes a piezoelectric element which moves the transparent condensing medium.

30. An optical head recited in claim 2, wherein the aperture is made by a process which includes a step of etching from a condense surface side of the transparent condensing medium.

31. An optical head recited in claim 2, wherein the laser emits a single laser beam, and the shade has a plurality of the small apertures at the position where the single laser beam forms a single beam spot.

32. An optical head recited in claim 2, wherein the laser emits a plurality of the laser beams, and the shade has a plurality of small apertures at the corresponding positions where the plurality of laser beams form a plurality of corresponding beam spots.

33. An optical head recited in claim 2, wherein the condense surface of the transparent condensing medium is orthogonal to the principal axis of the laser beam at the aperture.

34. An optical head recited in claim 2, wherein a periphery of the aperture on the transparent condensing medium comprises a surface inclined to the principal axis of the laser beam at the aperture.

35. An optical head recited in claim 2, wherein a periphery of the aperture on the transparent condensing medium comprises a scattering surface.

36. An optical head recited in claim 2, wherein the transparent condensing medium comprises a first transparent medium and a second transparent medium placed together closely, and the laser beam is incident on the first transparent medium and the condense surface on which the laser beam passing through the first transparent medium forms the beam spot is positioned on the surface of the second transparent medium.

37. An optical head recited in claim 36, wherein the second transparent medium consists a part of a flying slider to float the transparent condensing medium above an disk when the disk is rotated.

38. An optical head recited in claim 36, wherein the first and the second transparent medium have almost same refraction index.

39. An optical head recited in claim 2, wherein the laser is a semiconductor laser.

40. An optical head recited in claim 39, wherein the semiconductor laser is an edge surface emitting type semiconductor laser.

41. An optical head recited in claim 40, wherein an active layer of the end surface emitting type semiconductor laser is disposed so as to be perpendicular to the condense surface of the transparent condensing medium.

42. An optical head recited in claim 40, wherein an active layer of the end surface emitting type semiconductor laser is disposed so as to be collimated to the condense surface of the transparent condensing medium.

43. An optical head recited in claim 39, wherein the semiconductor laser is a surface emitting type semiconductor.

44. An optical head recited in claim 1, further includes a collimator lens positioned between the laser and the transparent condensing medium to collimate the laser beam emit from the laser.

45. An optical head recited in claim 1, further includes a collimator lens which collimates the laser beam and guides the collimated beam to the transparent condensing medium.

46. An optical head recited in claim 3, further includes a collimator lens which collimates the laser beam and guides the collimated beam to the optical condense element.

47. An optical head, comprising:
a laser emitting a laser beam;
a transparent condensing medium which has an incident surface on which the laser beam is incident, a reflect surface which reflects the laser beam being incident through the incident surface, and an condense surface on which the reflected laser beam condenses to form the beam spot; and
a shade provided on the transparent condensing medium and having an aperture, wherein the aperture is positioned at which the beam spot is formed and an area of the aperture is smaller than a size of the beam spot.

48. An optical head recited in claim 47, further including a reflector attached on the reflect surface.

49. An optical head recited in claim 47, wherein the reflect surface comprises a part of a paraboloid of revolution.

50. An optical head recited in claim 47, wherein the reflect surface is planar, and the reflecting film is a planar reflecting type hologram.

51. An optical head recited in claim 47, further including a collimator lens which collimates the laser beam and guides the collimated beam to the transparent condensing medium.

52. An optical head recited in claim 47, wherein a width of the aperture is smaller than the wavelength of the laser beam.

53. An optical head recited in claim 47, wherein the shade has a thickness smaller than the wavelength of the laser beam.

54. An optical head recited in claim 47, wherein the transparent condensing medium comprises a first transparent medium and a second transparent medium placed closely together, and
the laser beam is incident on the first transparent medium and the condense surface on which the laser beam passing through the first transparent medium forms the beam spot is positioned on the surface of the second transparent medium.

55. An optical head recited in claim 54, wherein the second transparent medium is a part of a flying slider to float the transparent condensing medium above a disk when the disk is rotated.

56. An optical head recited in claim 54, wherein the first and the second transparent medium have almost the same refraction index.

57. An optical head recited in claim 54, further comprising a piezoelectric element which moves the transparent condensing medium.

58. An optical head recited in claim 54, further comprising a base which fixes at least the transparent condensing medium and the laser, wherein the base scans over a disk to read and/or write data.

59. An optical head, comprising:
a laser emitting a laser beam;
a transparent condensing medium having a condense surface on which the condensed laser beam forms a beam spot; and
a shade provided on the transparent condensing medium and having a rectangular aperture, wherein the aperture is positioned at which the beam spot is formed and an area of the aperture is smaller than a size of the beam spot.

60. An optical head recited in claim 59, wherein the transparent condensing medium comprises one of a Solid Immersion Lens and Super Solid Immersion Lens.

61. An optical head recited in claim 59, wherein the transparent condensing medium has an incident surface on which the laser beam is incident, a reflect surface which reflects the laser beam being incident through the incident surface, and an condense surface on which the reflected laser beam condenses to form the beam spot.

62. An optical head recited in claim 61, further comprising a reflector attached on the reflect surface.

63. An optical head recited in claim 61, wherein the reflect surface comprises a part of a paraboloid of revolution.

64. An optical head, comprising:
a laser emitting a laser beam;
a transparent condensing medium having a condense surface on which the condensed laser beam forms a beam spot; and
a shade provided on the transparent condensing medium, having an aperture, wherein the aperture is positioned at which the beam spot is formed and an area of the aperture is smaller than a size of the beam spot and the shade has a periphery that allows the reflected beam of the near field wave to pass the outside of periphery of the shading film and to enter to the transparent condensing medium in addition to the inside of the aperture.

65. An optical head, comprising:
a laser emitting a laser beam;
a transparent condensing medium having a condense surface on which the condensed laser beam forms a beam spot; and
a shade provided on the transparent condensing medium, having an aperture, wherein the aperture is positioned at which the beam spot is formed and an area of the aperture is smaller than a size of the beam spot and a periphery of the aperture on the transparent condensing medium comprises an inclined surface that is angled relative to the plane perpendicular to the principal axis of the laser beam at the aperture.

66. An optical head, comprising:
a laser emitting a laser beam;
a transparent condensing medium having a condense surface on which the condensed laser beam forms a beam spot; and
a shade provided on the transparent condensing medium, having an aperture, wherein the aperture is positioned at which the beam spot is formed and an area of the aperture is smaller than a size of the beam spot, and a periphery of the aperture on the transparent condensing medium comprises a scattering surface.

* * * * *